United States Patent
Kim et al.

(10) Patent No.: US 9,646,204 B2
(45) Date of Patent: May 9, 2017

(54) ELECTRONIC DEVICE AND METHOD FOR OUTLINE CORRECTION

(71) Applicant: Samsung Electronics Co., Ltd., Gyeonggi-do (KR)

(72) Inventors: Do-Hyeon Kim, Gyeonggi-do (KR); Dong-Chang Lee, Gyeonggi-do (KR); Ho-Young Jung, Gyeonggi-do (KR); Jae-Woong Lee, Gyeonggi-do (KR); Seong-Taek Hwang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 7 days.

(21) Appl. No.: 14/466,479

(22) Filed: Aug. 22, 2014

(65) Prior Publication Data

US 2015/0055865 A1  Feb. 26, 2015

(30) Foreign Application Priority Data

Aug. 22, 2013  (KR) .................. 10-2013-0099810

(51) Int. Cl.
| | | |
|---|---|---|
| *G06K 9/32* | (2006.01) | |
| *G06K 9/46* | (2006.01) | |
| *G06K 9/00* | (2006.01) | |
| *G06K 9/22* | (2006.01) | |
| *G06K 9/48* | (2006.01) | |

(52) U.S. Cl.
CPC ..... *G06K 9/00536* (2013.01); *G06K 9/00416* (2013.01); *G06K 9/222* (2013.01); *G06K 9/3233* (2013.01); *G06K 9/481* (2013.01); *G06K 9/4604* (2013.01)

(58) Field of Classification Search
CPC ........... G06K 9/00416; G06K 9/00536; G06K 9/222; G06K 9/3233; G06K 9/481; G06F 3/01
USPC .................................................. 382/173, 224
See application file for complete search history.

(56) References Cited

U.S. PATENT DOCUMENTS

| | | | | |
|---|---|---|---|---|
| 4,674,058 | A * | 6/1987 | Lindbloom et al. .......... | 345/441 |
| 6,304,677 | B1 * | 10/2001 | Schuster ....................... | 382/264 |
| 6,597,808 | B1 * | 7/2003 | Guo ..................... | G06K 9/2054 |
| | | | | 382/173 |
| 7,706,586 | B2 * | 4/2010 | Deischinger .................. | 382/128 |
| 7,783,094 | B2 * | 8/2010 | Collins et al. ................ | 382/128 |
| 2005/0198591 | A1 | 9/2005 | Jarrett et al. | |
| 2005/0219633 | A1 * | 10/2005 | Chien ..................... | G06T 5/001 |
| | | | | 358/3.27 |
| 2008/0037834 | A1 * | 2/2008 | Abe ............................. | 382/115 |
| 2010/0021058 | A1 * | 1/2010 | Beikirch et al. .............. | 382/173 |
| 2010/0104198 | A1 * | 4/2010 | Chang et al. ................. | 382/199 |
| 2011/0058745 | A1 * | 3/2011 | Sanami ........................ | 382/190 |

(Continued)

OTHER PUBLICATIONS

Volusion (GE Volusion 730Expert Basic User Manual, pp. 11-48 to 11-51, 2004).*

*Primary Examiner* — Yubin Hung

(74) *Attorney, Agent, or Firm* — The Farrell Law Firm, P.C.

(57) ABSTRACT

An electronic device and an image processing method in the electronic device are provided. The electronic device includes a display unit configured to display an image; and a controller configured to correct an outline according to a drawing input with a correction scheme on the image and to crop the image within the corrected outline according to the corrected outline.

18 Claims, 47 Drawing Sheets

(56) References Cited

U.S. PATENT DOCUMENTS

| | | | |
|---|---|---|---|
| 2012/0065499 A1* | 3/2012 | Chono | A61B 8/00 600/425 |
| 2012/0176416 A1 | 7/2012 | Dondurur et al. | |
| 2014/0079334 A1* | 3/2014 | Verrall et al. | 382/274 |
| 2014/0140626 A1* | 5/2014 | Cho et al. | 382/199 |
| 2014/0245167 A1* | 8/2014 | Ringer | G06F 17/3087 715/744 |
| 2014/0343897 A1* | 11/2014 | Trotter | G01N 15/1429 702/189 |
| 2015/0248780 A1* | 9/2015 | Caridad | G06T 11/60 345/441 |
| 2015/0379618 A1* | 12/2015 | Neumann | G06Q 30/06 705/14.55 |

* cited by examiner

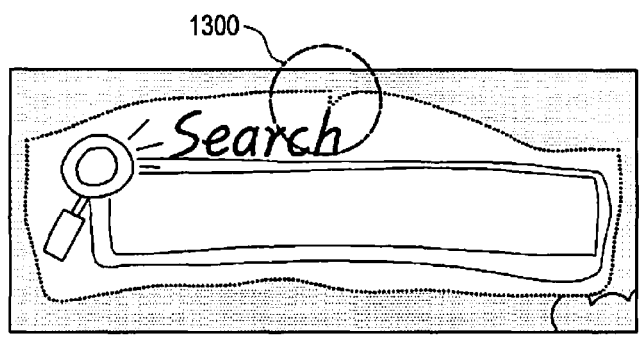
FIG.13A
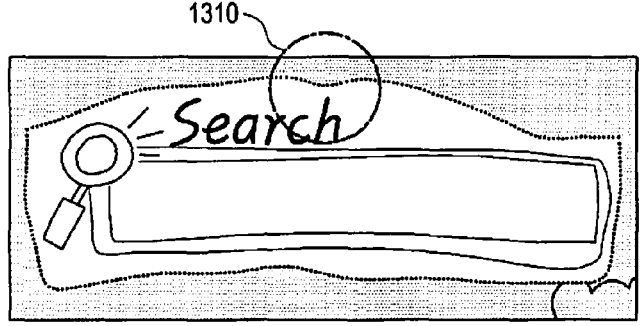
FIG.13B

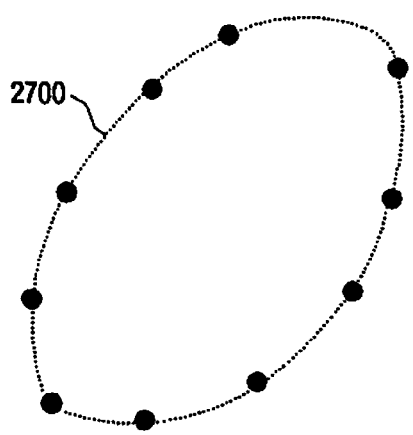

FIG.27A

```
iterations = 0
bestfit = nil
besterr = something really large
while iterations < N {
    maybeinliers = m randomly selected values from data
    maybemodel = model parameters fitted to maybeinliers
    alsoinliers = empty set
    for every point in data not in maybeinliers {
        if point fits maybemodel with an error smaller than t
            add point to alsoinliers
    }
    if the number of elements in alsoinliers is > d {
        % this implies that we may have found a good model
        % now test how good it is
        bettermodel = model parameters fitted to all points in maybeinliers and alsoinliers
        thiserr = a measure of how well model fits these points
        if thiserr < besterr {
            bestfit = bettermodel
            besterr = thiserr
        }
    }
    increment iterations
}
return bestfit
```

FIG.27B

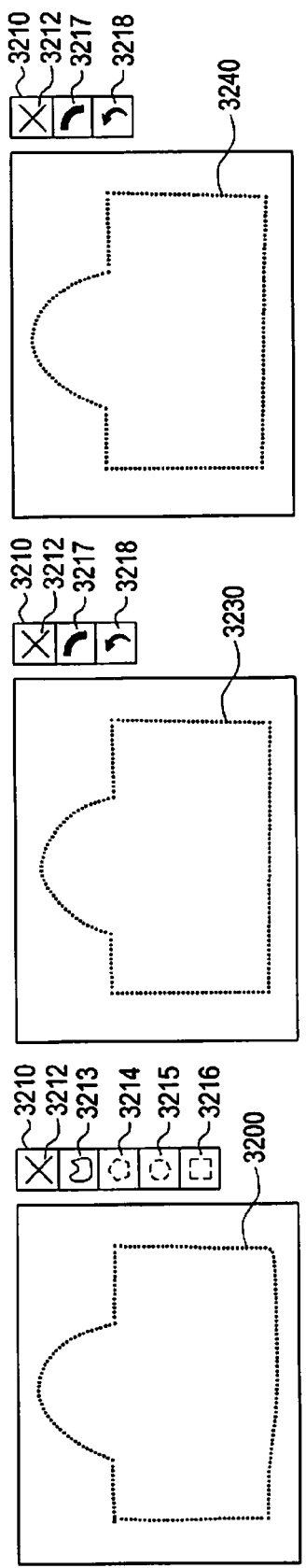
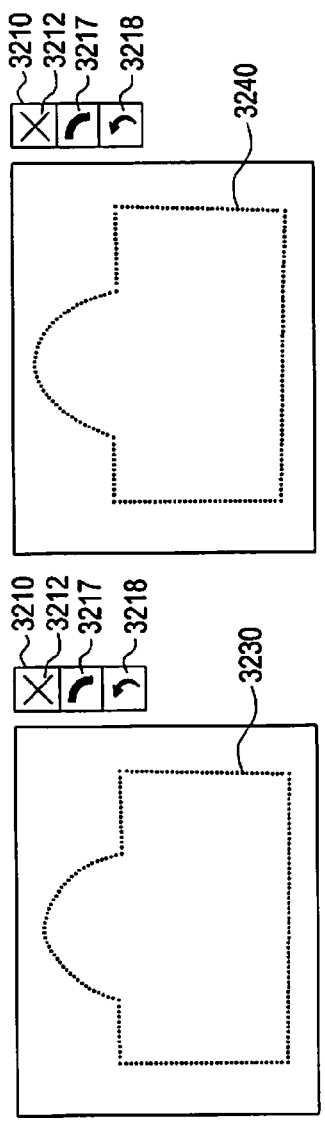
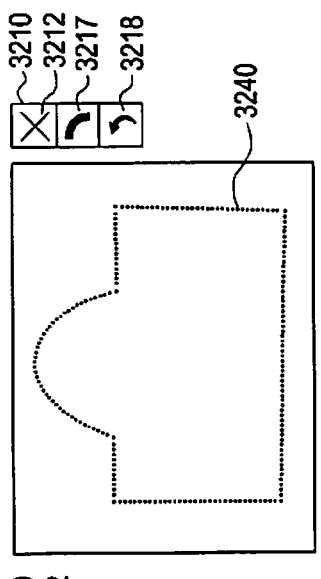
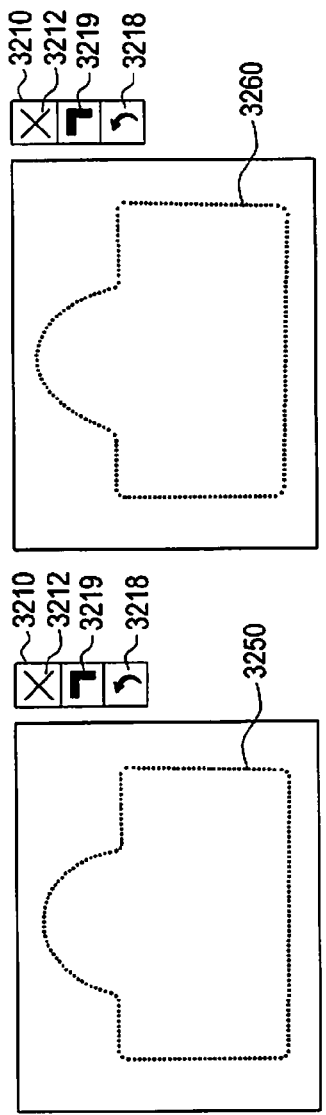
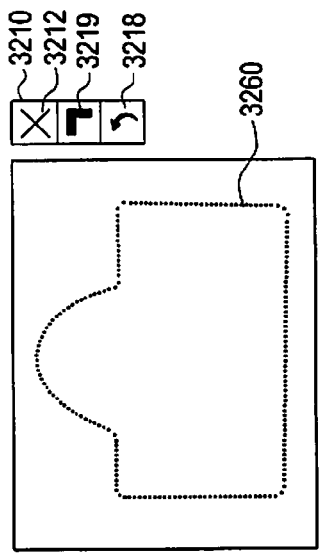

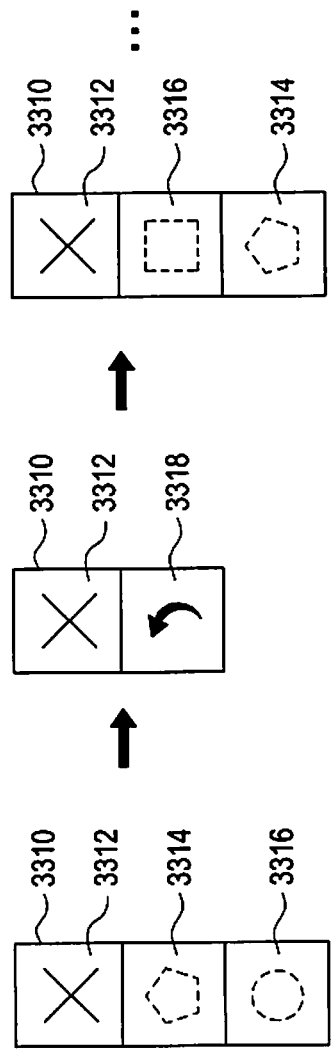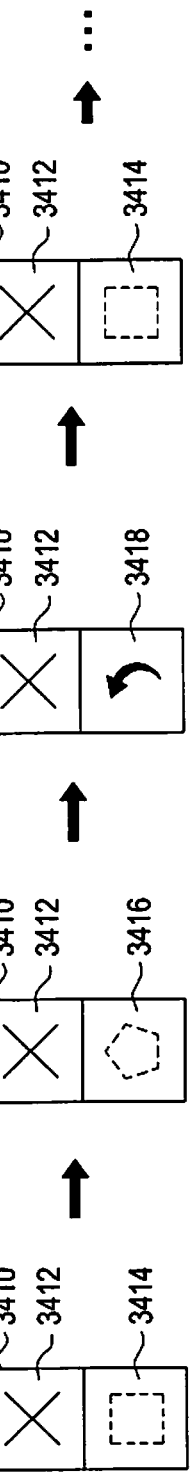

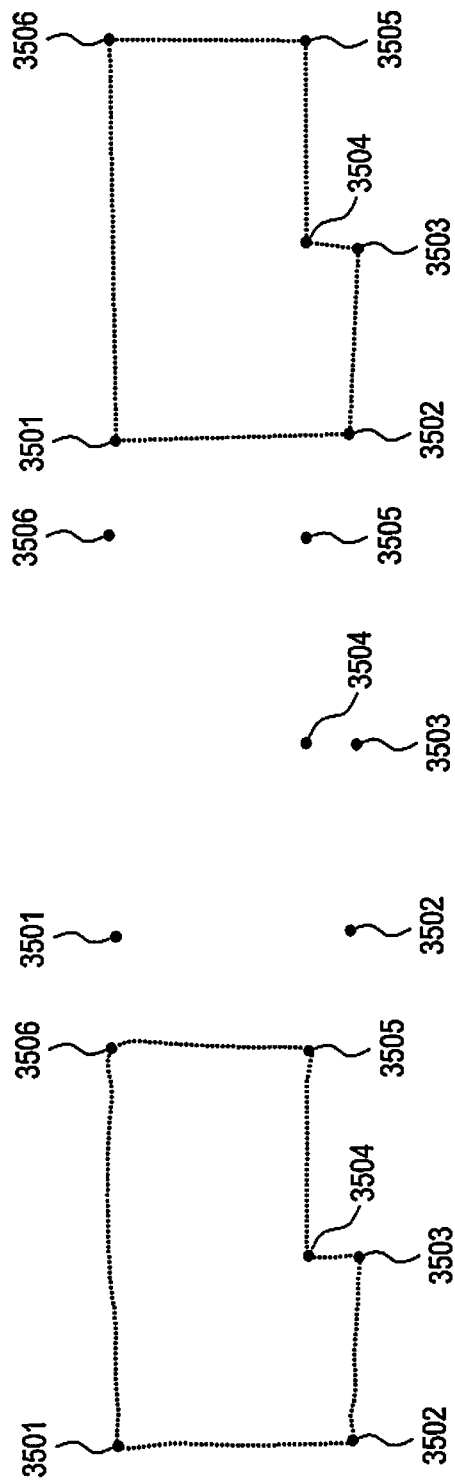

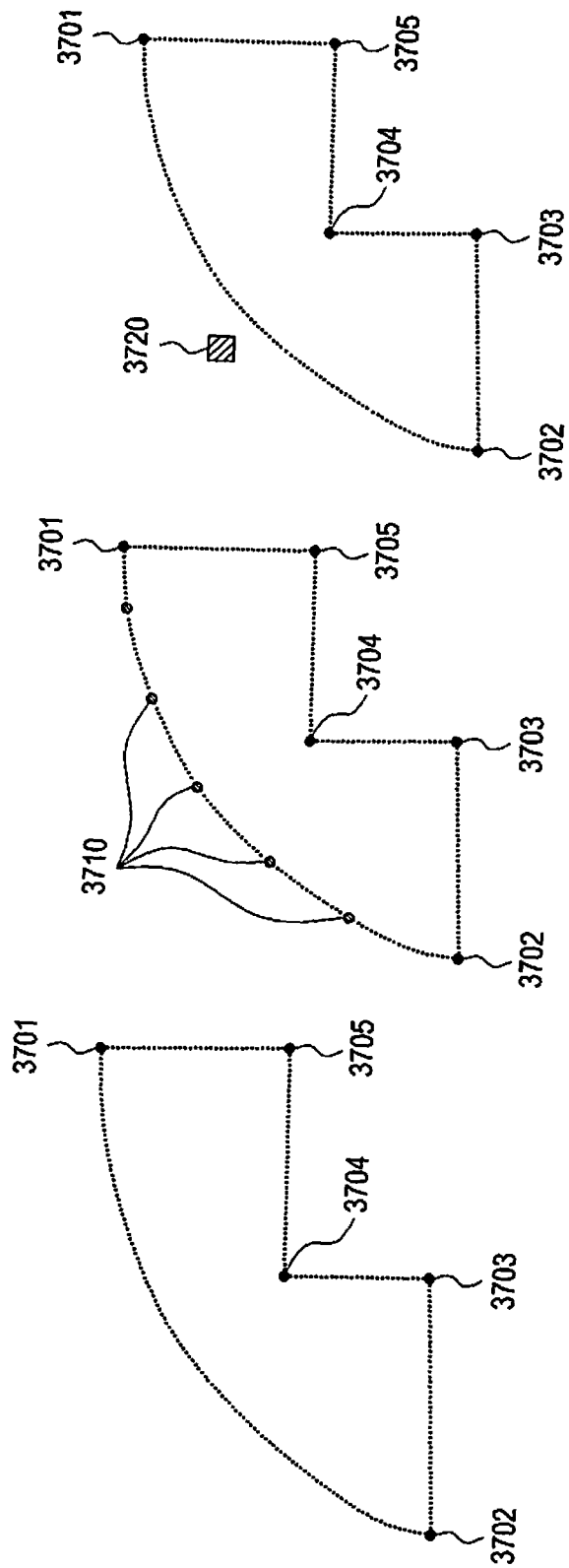

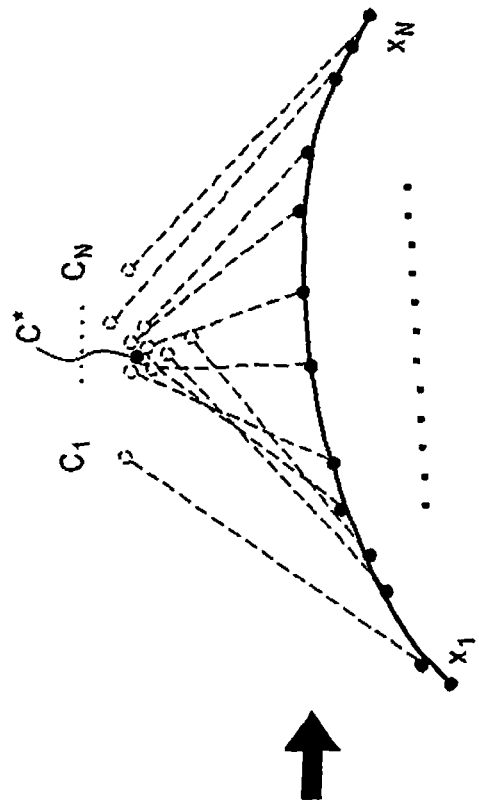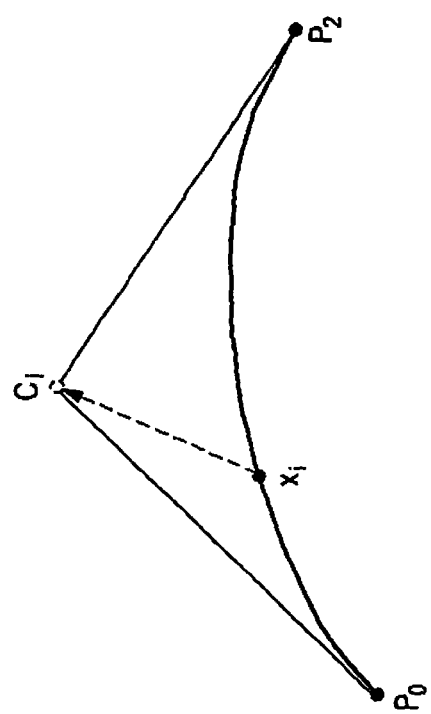
FIG.39B
FIG.39A

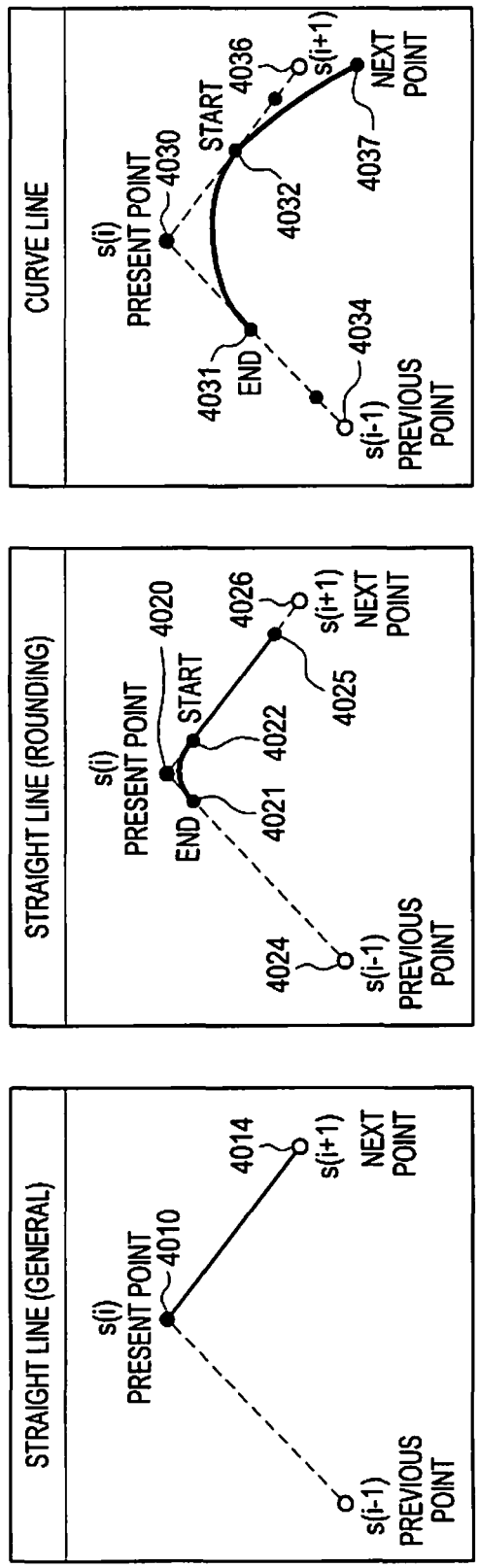

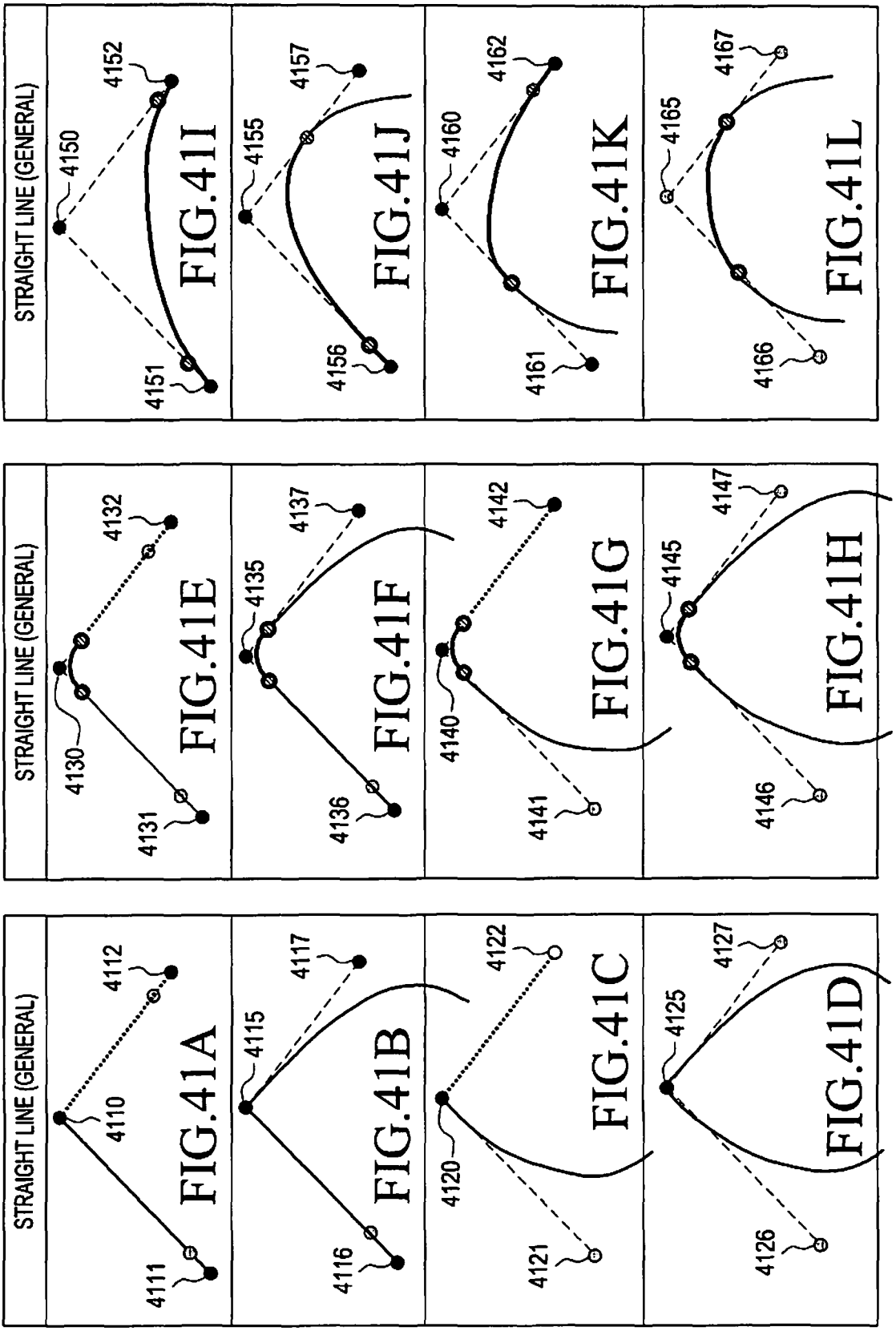

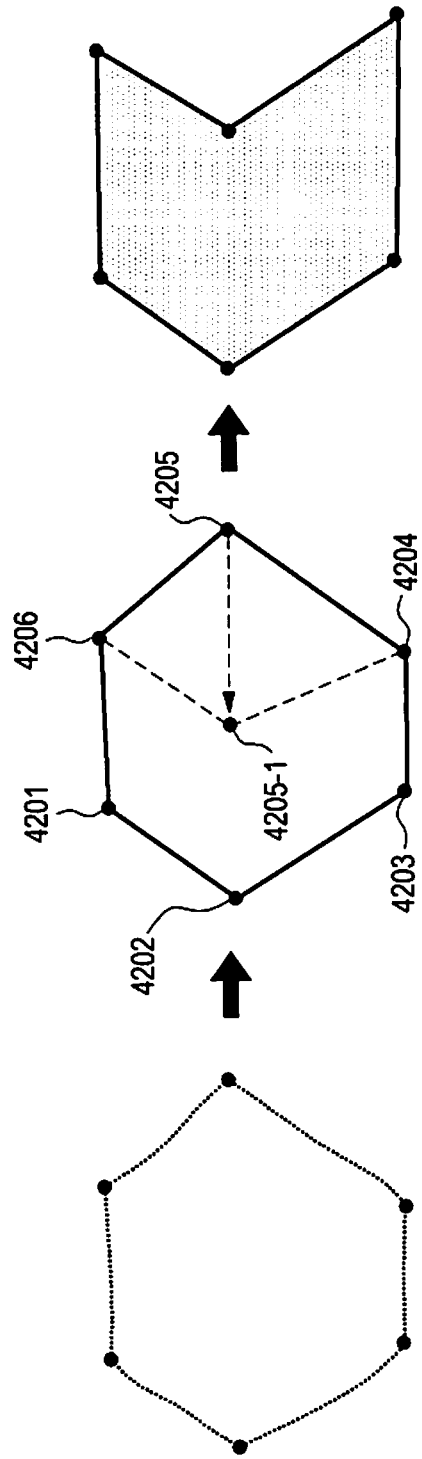

ELECTRONIC DEVICE AND METHOD FOR OUTLINE CORRECTION

PRIORITY

This application claims priority under 35 U.S.C. §119(a) to Korean Application Serial No. 10-2013-0099810, which was filed in the Korean Intellectual Property Office on Aug. 22, 2013, the entire content of which is incorporated herein by reference.

BACKGROUND

1. Field of the Invention

The present disclosure generally relates to an electronic device and an image processing method in the electronic device.

2. Description of the Related Art

The portable terminal has been developed to perform a function which can acquire an image through an internal or external camera and store the image and an image processing function which can process the stored image. For example, the portable terminal has been developed to process an image by various methods.

However, an image processing function of the portable terminal can only perform a simple image processing such as an image color change, an image size adjustment, and the like. Thus, an image processing requirement which a user wants cannot be fulfilled.

SUMMARY

The present disclosure has been made to address at least the above problems and/or disadvantages and to provide at least the advantages described below. Accordingly, an aspect of the present disclosure is to provide an electronic device which can more conveniently and exquisitely process an image and an image processing method in the electronic device.

Another aspect of the present disclosure is to provide an electronic device which can crop a part of an image displayed on an electronic device screen using a pen and an image processing method in the electronic device.

Another aspect of the present disclosure is to provide an electronic device which can correct an outline shape according to a drawing input when the drawing input is input using a pen in order to crop a part of an image displayed on an electronic device screen and an image processing method in the electronic device.

Another aspect of the present disclosure is to provide an electronic device which can selectively correct an outline shape according to a drawing input with various correction schemes such as a outline correction scheme, a shape recognition correction scheme, and the like, when the drawing input is input using a pen in order to crop a part of an image displayed on an electronic device screen and an image processing method in the electronic device.

Another aspect of the present disclosure is to provide an electronic device which can recommend a cropping shape by recognizing an outline shape according to a drawing input when the drawing input is input using a pen in order to crop a part of an image displayed on an electronic device screen and an image processing method in the electronic device.

In accordance with an aspect of the present disclosure, an electronic device is provided, which includes a display unit configured to display an image; and a controller configured to correct an outline according to a drawing input with a correction scheme on the image and to crop the image within the corrected outline according to the corrected outline.

In accordance with another aspect of the present disclosure, an image processing method in an electronic device is provided, which includes displaying an image; correcting an outline according to a drawing input with a correction scheme on the image; and cropping the image within the corrected outline according the corrected outline.

In accordance with another aspect of the present disclosure, a storage medium which stores an image processing program performing a method in a portable terminal is provided. The method includes displaying an image; correcting an outline according to a drawing input with a correction scheme on the image; and cropping the image within the corrected outline according the corrected outline.

BRIEF DESCRIPTION OF THE DRAWINGS

The above and other aspects, features, and advantages of the present disclosure will be more apparent from the following detailed description, taken in conjunction with the accompanying drawings, in which:

FIGS. 11A, 11B, 12A, 12B, 13A, 13B, 14A and 14B illustrate examples in which an end point is processed according to an embodiment of the present disclosure;

FIGS. 27A-27B illustrate a circular shape checking method using a RANSAC scheme according to an embodiment of the present disclosure;

FIGS. 29A-29C, 30A-30E, 31A-31D, and 32A-32E illustrate a shape recommending scheme according to an embodiment of the present disclosure;

FIGS. 33A-33C and 34A-34D illustrate a display scheme of a selection bar for a shape recommendation according to an embodiment of the present disclosure;

FIGS. 35A-35C, 36A-36B and 37A-37C illustrate examples of an operation of adjusting and arranging positions of points on an outline according to an embodiment of the present disclosure;

FIGS. 38 and 39A-39B illustrate a curve line control point calculating method using a Bezier curve formula according to an embodiment of the present disclosure;

FIGS. 40A-40C and 41A-41L illustrate an operation of connecting the points according to the adjustment and arrangement of positions of points and generating a corrected outline according to an embodiment of the present disclosure;

FIGS. 42A-42C and 43A-43C illustrate an outline shape change according to a corrected outline shape adjustment request according to an embodiment of the present disclosure;

DETAILED DESCRIPTION OF EMBODIMENTS OF THE PRESENT INVENTION

Figure 1:
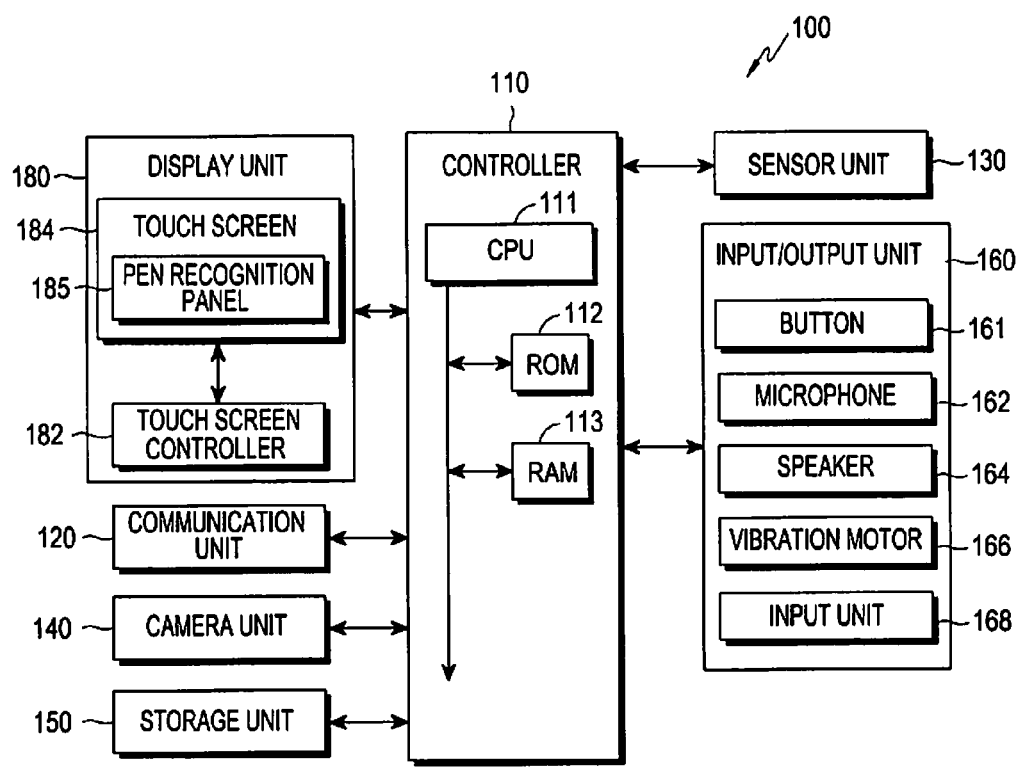
FIG. 1 is a block diagram illustrating a configuration of a portable terminal according to an embodiment of the present disclosure.

Hereinafter, various embodiments of the present disclosure will be described in detail.

With respect to the terms used in describing the various embodiments of the present invention, the general terms which are currently and widely used are selected in consideration of functions of structural elements in the various embodiments of the present disclosure. However, meanings of the terms may be changed according to a judicial precedent, appearance of a new technology, etc. In addition, in certain cases, a term arbitrarily selected may be used. In such a case, the meaning of the term will be described in detail at the corresponding part in the description of the present disclosure. Thus, the terms used in various embodiments of the present disclosure should be defined based on the meanings of the terms and the overall contents of the embodiments of the present disclosure instead of simple titles of the terms.

In various embodiments of the present disclosure, when a part "includes" a component element, it does not mean excluding other component elements but it shall be construed that one or more other components can be included unless they are specifically described to the contrary. Also, the terms, such as "unit", "module", and the like, mean a unit for processing at least a function or an operation, and may be embodied through hardware, software, or a combination hardware and software.

Hereinafter, the various embodiments of the present disclosure will be described in detail with reference to accompanying drawings. However, the present disclosure is not restricted by the embodiments, and is not limited to the embodiments. The same reference numerals represented in each of the drawings indicate the elements that perform substantially the same functions.

According to various embodiments of the present disclosure, an image can be more conveniently processed in a portable terminal.

According to embodiments of the present disclosure, an outline which is drawn by a user is corrected to be smooth through the outline correction scheme or the shape recognition correction scheme so as to more clearly crop the image when the image is cropped by using the outline.

According to the embodiments of the present disclosure, when an image is cropped, various outline shapes are recommended with a convenient scheme and an outline can be selected according to a shape selected by a user so that the user can conveniently crop the image into a shape which the user wants.

According to an embodiment of the present disclosure, an electronic device may be a portable terminal such as a cellular phone, a smartphone, and a tablet PC. FIG. 1 is a block diagram illustrating a configuration of a portable terminal according to an embodiment of the present disclosure. Referring to FIG. 1, a portable terminal (hereinafter, referred to as a device) 100 includes a controller 110, a communication unit 120, a sensor unit 130, a camera unit 140, a storage unit 150, an input/output unit 160, a touch screen controller 182, and a touch screen 184.

The controller 110 includes a Central Processor Unit (CPU) 111. The controller 110 also includes a Digital Signal Processor (DSP), a Read Only Memory (ROM) 112 in which a control program is stored for a control of the portable terminal 100, and a Random Access Memory (RAM) 113 which stores a signal or data input from outside of the portable terminal 100 or is used as a storage area for an operation performed in the portable terminal 100. The CPU may include a single core type CPU, a dual core type CPU, a triple core type CPU, or a quad core type CPU. The CPU 111, the RAM 113 and the ROM 112 may be connected with each other through internal buses.

The controller 110 controls the communication unit 120, the sensor unit 130, the camera unit 140, the storage unit 150, the input/output unit 160 and a display unit 180. That is, the controller 110 performs an overall control function for the portable terminal 100, and controls signal flows between the above-described structural elements.

According to an embodiment of the present disclosure, when a drawing input has been received on an image displayed in the touch screen 184, the controller 110 performs an outline preprocessing according to the drawing input and generates a corrected outline according to a predetermined correction scheme. The predetermined correcting scheme may include an outline correction or a shape recognition correction.

When a corrected outline is generated according to the outline correction, the controller 110 smoothes points between inflection points on a preprocessed outline and connects each point on the smoothed outline so as to generate the corrected outline.

When a corrected outline is generated according to the shape recognition correction, the controller 110 recognizes a pre-processed outline shape, after determining the outline shape as a result of the shape recognition, performs an adjustment and an arrangement of positions of inflection points according to the determined outline shape, and connects the adjusted and arranged inflection points so as to generate a corrected outline.

When an outline shape adjustment has been requested as the inflection point position changes, the controller 110 adjusts a changed inflection point position and connects the adjusted inflection point position so as to generate the adjusted outline. The controller 110 may crop (hereinafter, also referred to as cut) an image according to the outline corrected by the outline correction or the shape recognition correction.

The communication unit 120 connects the portable terminal 100 with an external device. The external device includes a different device, a mobile phone, a smart phone, a tablet PC, and a server. The communication unit 120 enables the portable terminal 100 to be connected with the external device through mobile communication by using one antenna or a plurality of antennas under a control of the controller 110. The communication unit 120 transmits/receives a wireless signal for voice communication, image communication, a text message (Short Message Service (SMS)), or a multimedia message (Multimedia Message Service (MMS)) to/from a portable phone of which the phone number is input to the portable terminal 100, a smart phone, a tablet PC, or other apparatuses. The communication unit 120 may further include at least one of a wireless Local Area Network (LAN) module and a short-range communication module. The wireless LAN module may be connected to the Internet under a control of the controller 110 in a place where a wireless Access Point (AP) is installed. The wireless LAN module may support the wireless LAN provision (IEEE802.11x) of the Institute of American Electrical and Electronics Engineers (IEEE). The short-range communication module may perform short range communication wirelessly between the portable terminal 100 and an image forming apparatus under the control of the controller 110. The short-range communication scheme may include Bluetooth, Infrared Data Association (IrDA) communication, etc.

The sensor unit 130 includes at least one sensor which detects a state (e.g., temperature, acceleration, etc.) of the portable terminal 100. For example, the sensor unit 130 may include at least one sensor among a temperature sensor detecting a temperature around the portable terminal 100, a humidity sensor detecting a humidity around the portable terminal 100, an acceleration sensor detecting an acceleration applied to the portable terminal 100, and a Geomagnetic sensor detecting a point of the compass using the Earth's magnetic field. The sensor unit 130 may further include at least one among a proximity sensor detecting existence or non-existence of an approach to a user's terminal 100, a illumination sensor detecting an amount of a light around the terminal 100, a motion sensor detecting an operation (e.g. a rotation of the portable terminal 100, an acceleration or vibration applied to the portable terminal 100) of the portable terminal 100, a gravity sensor detecting a gravitational action direction, and an altimeter measuring an atmospheric pressure so as to detect an altitude. At least one sensor may detect a state related to circumstances of the terminal and generate a signal corresponding to the detection so as to transmit the signal to the controller 110. A sensor of the sensor unit 130 may be further added or removed according to a function of the terminal 100.

The camera unit 140 includes one or more cameras (e.g. a first camera and a second camera) which photograph a still image or a video under the control of the controller 110. The camera unit 140 may further include at least one of a barrel assembly performing zoom in/out for photographing a subject, a motor unit controlling a movement of the barrel assembly, and a flash providing an auxiliary light required to photograph the subject. The camera unit 140 may photograph a three-dimensional still image or a three-dimensional video. The camera unit 140 may transmit the photographed picture or video to the controller 110. The first and second cameras may each include a lens, an image sensor, and the like. The first and second cameras may each convert an optical signal input (or a photographed picture or video) through a lens into an electrical image signal and then output the electrical image signal to the controller 110 so that a user can photograph a video or a still image through the first and second cameras.

The storage unit 150 stores signals or data input/output corresponding to operations of the communication unit 120, the sensor unit 130, the camera unit 140, the input/output unit 160, and the display unit 180 under the control of the controller 110. The storage unit 150 stores plural programs and plural applications for controlling the portable terminal 100 or the controller 110, and a program and data for executing various functions. In addition, the storage unit 150 stores a program for performing an image processing as described in the present disclosure including an outline correction, a shape recognition correction, an image cropping, and the like, according to an embodiment of the present disclosure.

The storage unit may include a ROM and a RAM within the controller 110, or a memory card (for example, an Secure Digital (SD) card or a memory stick) installed in the terminal 100. The storage unit 150 may also include a non-volatile memory, a volatile memory, a Hard Disk Drive (HDD), or a Solid State Drive (SSD).

The storage unit 150 may be a machine-readable medium, e.g., a computer-readable medium, which is defined as a medium for providing data to the machine so that the machine can perform a specific function. The machine readable medium may be storage medium. The storage unit 150 may include a non-volatile medium and a volatile medium. All of these media should be of a type that allows the instructions transferred by the medium to be detected by a physical instrument in which the machine reads the instructions into the physical instrument. The machine-readable medium includes, but is not limited to, at least one of a floppy disk, a flexible disk, a hard disk, a magnetic tape, a Compact Disc Read-Only Memory (CD-ROM), an optical disk, a punch card, a paper tape, a RAM, a Programmable Read-Only Memory (PROM), an Erasable PROM (EPROM), and a Flash EPROM.

The input/output unit 160 includes a button 161, a microphone 162, a speaker 164, a vibration motor 166, and an input unit 168. The input/output unit 160 is not limited to those described above, and may include a cursor controller, such as a mouse, a trackball, a joystick, and cursor directional keys, in order to control movement of a cursor on the display unit 180 and the communication with the controller 110.

The microphone 162 is capable of receiving an input of voices or sounds involved in various sound sources to generate electric signals under the control of the controller 110.

The speaker 164 outputs sounds corresponding to various signals (e.g. a wireless signal, a broadcasting signal, a digital audio file, a digital video file, photography, and the like) received by the communication unit 120 and the camera unit 140 to outside of the terminal 100 under the control of the controller 110. One or more speakers 164 may be formed at a proper position or positions of the housing of the portable terminal 100.

The vibration motor 166 converts electric signals into mechanical vibrations under the control of the controller 110. For example, when the terminal 100 set to a vibration mode receives a voice call from any other apparatus, the vibration motor 166 is operated. The vibration motor 166 also operates in response to a user's touch operation which performs a touch on the display unit 180 and a continuous movement of a touch on the display unit 180.

The input unit 168 may be inserted into and kept in the portable terminal 100, and may be withdrawn and separated from the portable terminal 100 when it is used. The input unit 168 may be an input means which can perform an input of an approach to or a touch on the touch screen 184 such as a stylus pen (hereinafter, referred to as pen) and the like.

The display unit 180 includes a touch screen controller 182, a touch screen 184, a pen recognition panel 185, and the like, and provides user interfaces corresponding to various services (e.g. a call, a data transmission, broadcasting, photography) to a user. When the display unit 180 is a touch screen, at least one touch can be input through a user's body (e.g. a finger) or a touchable input unit 168 (e.g. a pen).

In the embodiments of the present disclosure, a touch is not limited to a contact between the touch screen 184 and the user's body or the touchable input unit, but may include a non-contact (e.g. a detectable distance (e.g. about 5 mm) without the contact between the touch screen 184 and the user's body or the touchable input unit). The detectable distance may be changed according to a performance or a structure of the portable terminal 100 on the touch screen 184. The touch screen 184 may be operated by distinguishing the contact (e.g., touch) event by the user's body or the touchable input unit and an input in the non-contact state (e.g. hovering) event. The touch screen 184 may be implemented in, for example, a resistive type, a capacitive type, an infrared type, or an acoustic wave type.

The display unit 180 including the touch screen 184 as described above displays an image under the control of the controller 110 according to the embodiment of the present disclosure and displays an outline according to a drawing input on the image. Further, the display unit 180 may display an outline corrected according to the outline correction or the shape recognition correction. The display unit 180 may also display an image cropped along the corrected outline.

Figure 2:
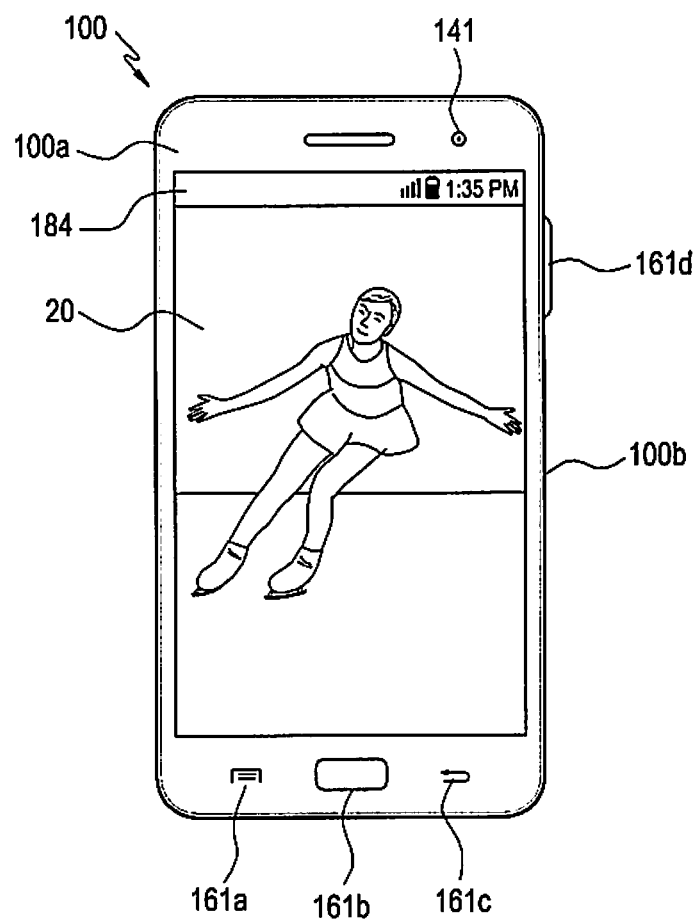
FIG. 2 illustrates a front perspective view of a portable terminal according to an embodiment of the present disclosure.
Figure 3:
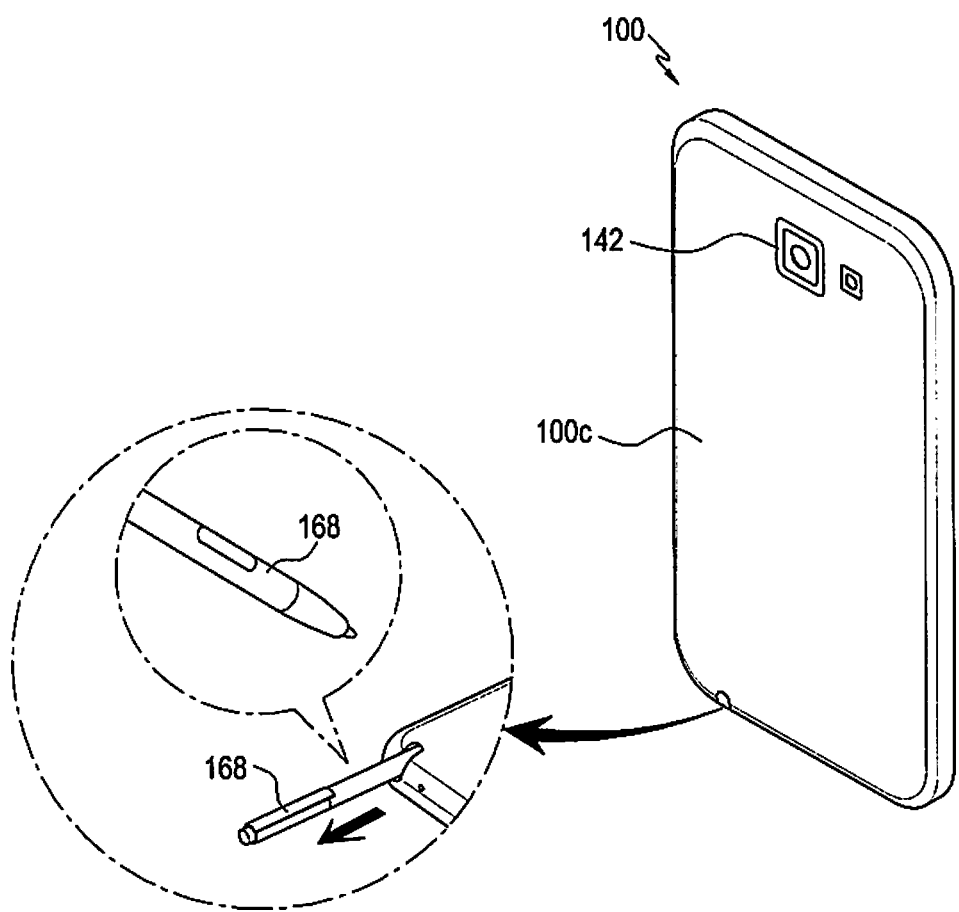
FIG. 3 illustrates a rear perspective view of a portable terminal according to an embodiment of the present disclosure.

FIG. 2 illustrates a front perspective view of the portable terminal according to an embodiment of the present disclosure, and FIG. 3 illustrates a rear perspective view of the portable terminal according to an embodiment of the present disclosure.

Referring to FIGS. 2 and 3, the touch screen 184 is disposed in the center of a front surface 100a of the portable terminal 100. The touch screen 184 may have a large size to occupy most of the front surface 100a of the portable terminal 100. FIG. 2 illustrates an example in which an image 20 is displayed on the touch screen 184. The image 20 may be an image photographed by a first camera 141 or a second camera 142 of the camera unit 140 or an image received from an external device.

The input unit 168 may be mounted through a side surface of a lower end of the portable terminal 100. The input unit 168 may be inserted into and kept in the portable terminal 100, and may be withdrawn and separated from the portable terminal 100 when it is used. The touch screen 184 may receive a drawing input according to a drawing operation using the input unit 168 by the user. The drawing operation may be performed when the input unit 168 is in contact with the touch screen 184, or may be performed when the input unit 168 is not in contact with the touch screen 184 but is adjacent, within a predetermined distance, to the touch screen 184.

Figure 4:
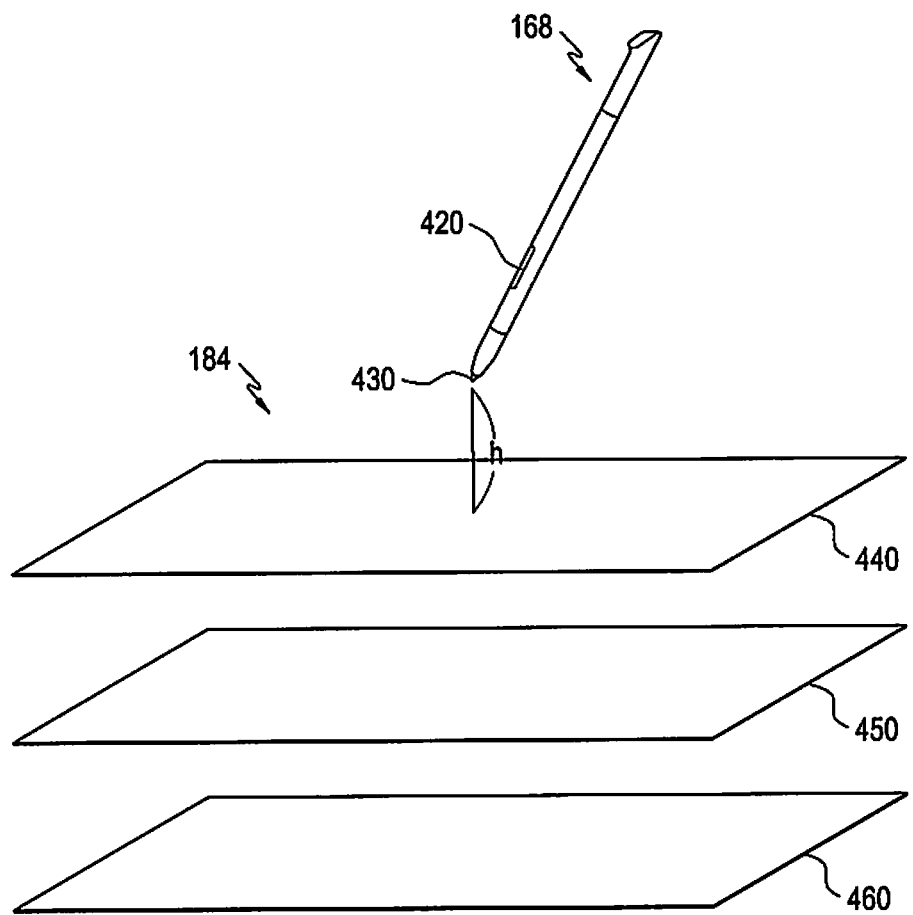
FIG. 4 illustrates an input unit and a touch screen according to an embodiment of the present disclosure.

FIG. 4 illustrates an input unit 168 and a touch screen 184 according to an embodiment of the present disclosure. Referring to FIG. 4, a touch screen 184 includes a first touch panel 440, a display panel 450, and a second touch panel 460. The display panel 450 may be a panel such as a Liquid Crystal Display (LCD), an Active Matrix Organic Light-Emitting Diode (AMOLED), and the like, and display various images according to an application execution and service and one or more drawing outlines.

The first touch panel 440 may be a capacitive overlay touch panel. When the input unit 168 has been touched on a surface of the first touch panel 440, a predetermined amount of charges moves to a touched position by static electricity and the first touch panel 440 recognizes a current variance according to a movement of the current so as to detect the touched position. Every touch capable of generating static electricity can be detected through the first touch panel 440 and can be induced by either a finger or the input unit 168.

The second touch panel 460 is an Electronic Magnetic Resonance (EMR) touch panel. When there is the input unit 168 having a resonant circuit therein near the loop coil of the second touch panel 460, a magnetic field transmitted from the corresponding loop coil generates a current based on mutual electromagnetic induction to the resonant circuit within the input unit 168. An induction magnetic field is generated, based on the current, from a coil configured as a resonance circuit in the interior of an input unit 168, and the second touch panel 460 detects the induction magnetic field around the loop coil in a signal reception state to sense a hovering location or a touch location of the input unit 168, and the portable terminal 100 detects a distance (h) from the first touch panel 440 to a pen point 430 of the input unit 168. It will be readily understood by those skilled in the art to which the present disclosure pertains that the distance (h) from the first touch panel 440 of the touch screen 184 to the pen point 430 may be varied to correspond to a performance or a structure of the portable terminal 100. If an input unit may cause a current based on electromagnetic induction through the second touch panel 460, a hovering event and a touch can be detected, and hereinafter, it will be described that the second touch panel 460 is to be used only for detection of the hovering event or the touch by the input unit 168. The input unit 168 may also be referred to as an electromagnetic pen or an EMR pen. Further, the input unit 168 may be different from a general pen that does not include the resonance circuit detected through the first touch panel 440. The input unit 168 may include a button 420 that may change an electromagnetic induction value generated by a coil that is disposed, in an interior of a penholder, adjacent to the pen point 430.

Therefore, in the portable terminal 100 according to an embodiment of the present disclosure, the first touch panel 440 detects a touch by a user's finger or the input unit 168, and the second touch panel 460 detects a hovering or a touch by the input unit 168. The controller 110 of the portable terminal 100 distinguishes and detects the touch by the user's finger or the input unit 168, and the hovering or the touch by the input unit 168. While only one touch screen is illustrated in FIG. 4, the present disclosure may include a plurality of touch screens, without being limited thereto. The touch screens may each be disposed in housings and may be connected with each other by hinges, or the plurality of touch screens may be disposed in a single housing. The plurality of touch screens include the display panel and the at least one touch panel as illustrated in FIG. 4.

Figure 5:
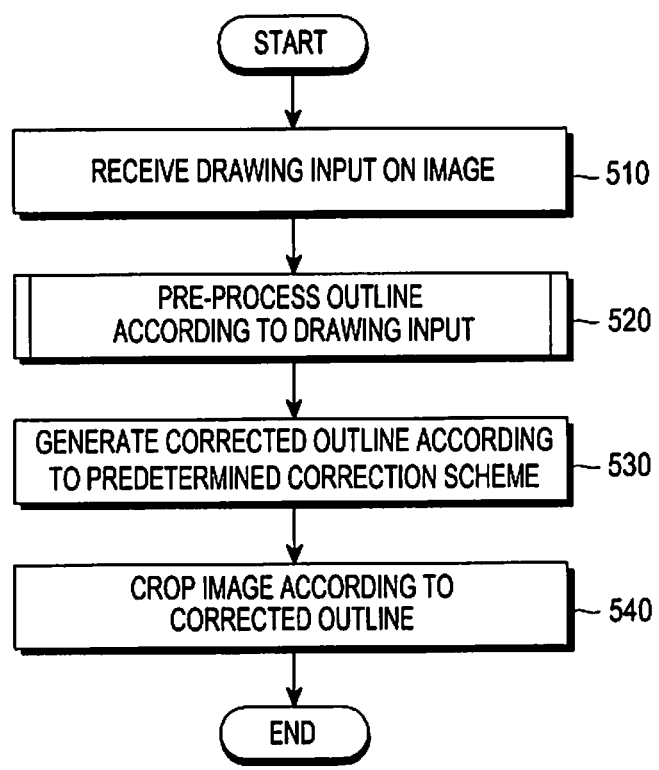
FIG. 5 is a flowchart illustrating an image processing operation in a portable terminal according to a first embodiment of the present disclosure.

FIG. 5 is a flowchart illustrating an image processing operation in a portable terminal 100 according to a first embodiment of the present disclosure.

Referring to FIG. 5, the portable terminal 100 receives a drawing input by the input unit 168 on an image displayed through the display unit 180 in step 510. For example, the portable terminal 100 may detect a touch or an approach to on the touch screen 184 through the input unit 168 such as a user's finger, a pen, and the like, and receive a drawing input according to a movement of the touch or the approach.

The portable terminal 100 performs an outline pre-processing according to the drawing input in step 520. For example, a predetermined pre-processing is performed according to the drawing input value detected by touch screen according to a drawing input. so that the outline can be generated. A specific outline pre-processing operation will be described in detail in a description of FIG. 7 below.

The portable terminal 100 may correct an outline generated as a result of the pre-processing according to a predetermined correction scheme and generate the corrected outline in step 530. For example, the predetermined correction scheme may be one of an outline correction scheme and a shape recognition correction scheme. Meanwhile, when an outline can be corrected to be smooth, another correction scheme other than the outline correction scheme and the shape recognition correction scheme may be used. An outline correction operation of the outline correction scheme will be described in detail in a description of FIGS. 19 to 22 below and an outline correction operation of the shape recognition correction scheme will be described in detail in a description of FIGS. 23 to 43.

The portable terminal 100 crops (cuts) an image according to the corrected outline in step 540. For example, the portable terminal 100 may crop an image within the corrected outline in a whole image area according to the corrected outline on the image.

Even though a case in which an outline is corrected according to the predetermined correction scheme has been described as an example, according to a second embodiment of the present disclosure, the outline may be corrected by selecting one correction scheme according to a user's selection among a plurality of correction schemes or a predetermined condition.

Figure 6:
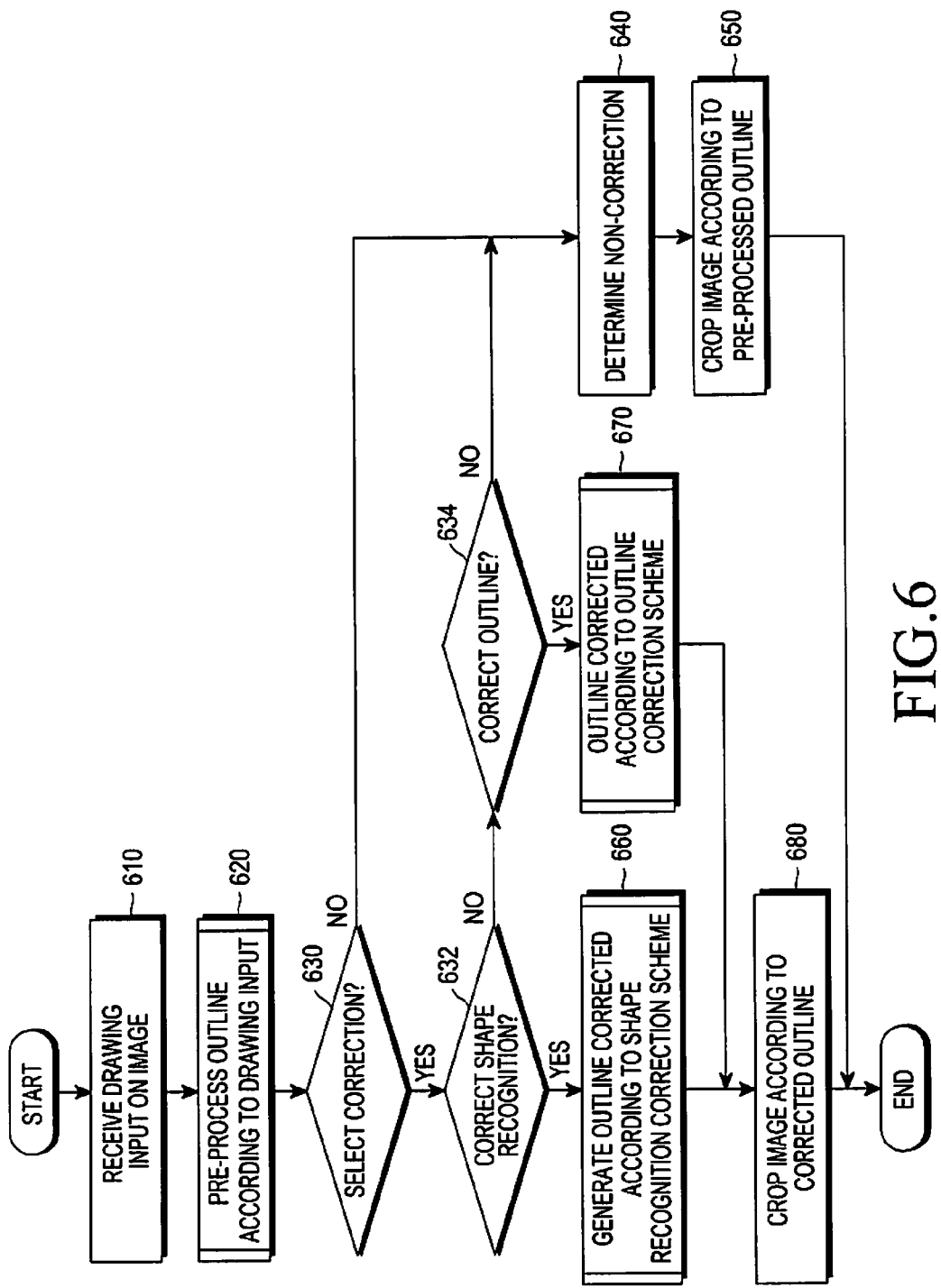
FIG. 6 is a flowchart illustrating an image processing operation in a portable terminal according to a second embodiment of the present disclosure.

FIG. 6 is a flowchart illustrating an image process operation in a portable terminal 100 according to a second embodiment of the present disclosure. Referring to FIG. 6, the portable terminal 100 receives a drawing input by the input unit 168 on an image displayed through the display unit 180 in step 610. For example, the portable terminal 100 may detect a touch or an approach on the touch screen 184 through the input unit 168, such as a user's finger, a pen, and the like, and receive a drawing input according to a movement of the touch or the approach.

The portable terminal 100 performs an outline pre-processing according to the drawing input in step 620. For example, a predetermined pre-processing is performed according to the drawing input value so that the outline can be generated. A specific outline pre-processing operation will be described in detail in a description of FIG. 7 below.

The portable terminal 100 selects an outline correction generated as a result of the pre-processing in step 630. For example, the portable terminal 100 may select whether an outline is corrected according to a user's selection and whether the outline is corrected according to a predetermined setting condition. Whether to correct the outline may be previously determined.

When it has been selected that the outline is not corrected, the portable terminal 100 determines that it will not perform a correction in step 640 and crops (cuts) an image according to the pre-processed outline in step 650. For example, the portable terminal 100 may crop an image within the pre-processed outline in a whole image area according to the pre-processed outline on the image.

When it has been selected that the outline is corrected, the portable terminal 100 determines whether a shape recognition correction is selected in step 632. When the shape recognition correction has been selected, the portable terminal 100 generates an outline corrected according to the shape recognition correction in step 660. An outline correction operation of a specific shape recognition correction scheme will be described in more detail in descriptions of FIGS. 23 to 43 below.

When the shape recognition correction has not been selected, the portable terminal 100 determines whether the outline correction is selected in step 634. When the outline correction has been selected, the portable terminal 100 generates an outline corrected according to the outline correction scheme in step 670. An outline correction operation of a specific outline correction scheme will be described in more detail in descriptions of FIGS. 19 to 22 below.

The portable terminal 100 crops (cuts) an image according to the shape recognition correction scheme or the outline correction scheme in step 680. For example, the portable terminal 100 may crop an image within the corrected outline in a whole image area according to the corrected outline on the image.

Figure 7:
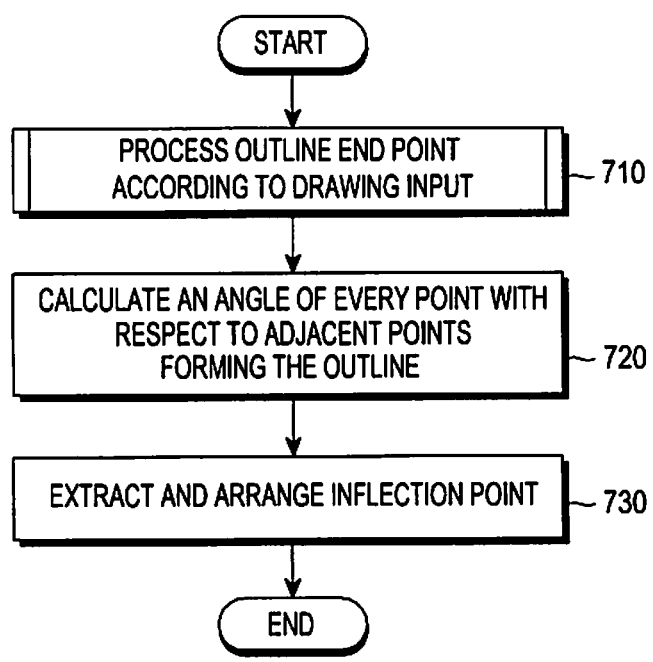
FIG. 7 is a flowchart illustrating an outline pre-processing operation in a portable terminal according to an embodiment of the present disclosure.

FIG. 7 is a flowchart illustrating an outline pre-processing operation in a portable terminal 100 according to an embodiment of the present disclosure.

Referring to FIG. 7, the portable terminal 100 performs an outline end point processing according to a drawing input in step 710. For example, the portable terminal 100 may allow a drawing start point and a drawing end point to be smoothly connected.

Figure 8:
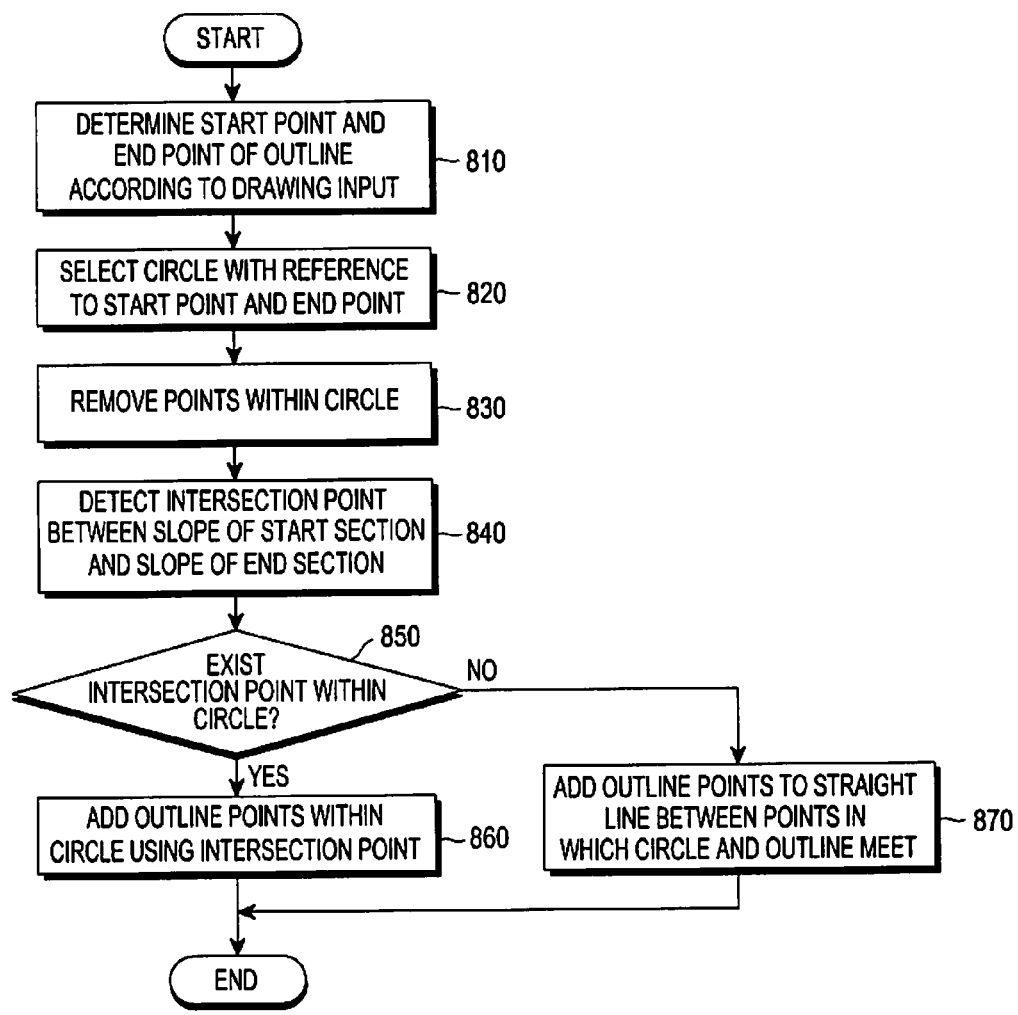
FIG. 8 is a flowchart illustrating an outline end point processing operation in a portable terminal according to an embodiment of the present disclosure.

Step 710 is described in detail with reference to FIGS. 8, 9A-9C and 10A-10C. FIG. 8 is a flowchart illustrating an outline end point processing operation in a portable terminal according to an embodiment of the present disclosure, and FIGS. 9A-9C and 10A-10C illustrate examples of an outline end point processing operation according to an embodiment of the present disclosure.

Referring to FIGS. 8, 9A-9C and 10A-10C, the portable terminal 100 determines a start point and an end point of an outline according to a drawing input in step 810.

Figure 9A:
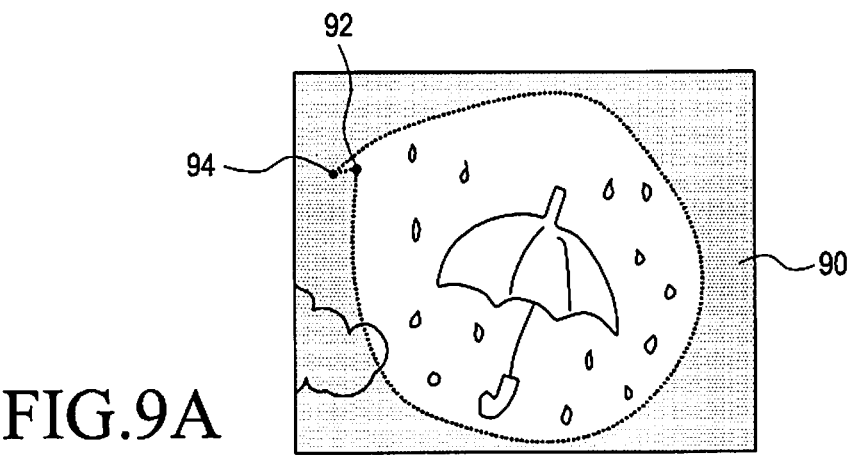
FIGS. 9A-9C and 10A-10C illustrate examples of an outline end point processing operation according to an embodiment of the present disclosure.

For example, as shown in FIG. 9A, the portable terminal 100 determines a drawing input start point 92 and a drawing input end point 94 on an image 90 according to a movement of a touch or an approach on the touch screen 184 through the input unit 168, such as a user's finger, a pen, and the like, when the image 90 is displayed on the touch screen 184.

Figure 10A:
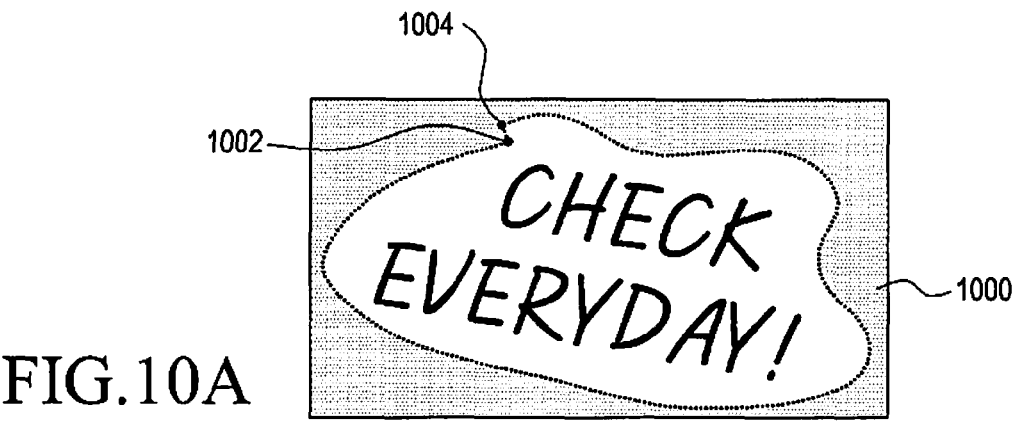

As another example, as shown in FIG. 10A, the portable terminal 100 determines a drawing input start point 1002 and a drawing input end point 1004 on an image 1000 according to a movement of a touch or an approach on the touch screen 184 through the input unit 168, such as a user's finger, a pen, and the like, when the image 1000 is displayed on the touch screen 184.

The portable terminal 100 selects a circle with reference to the start point and the end point in step 820. The circle may be a concentric circle or an ellipse.

Figure 9B:
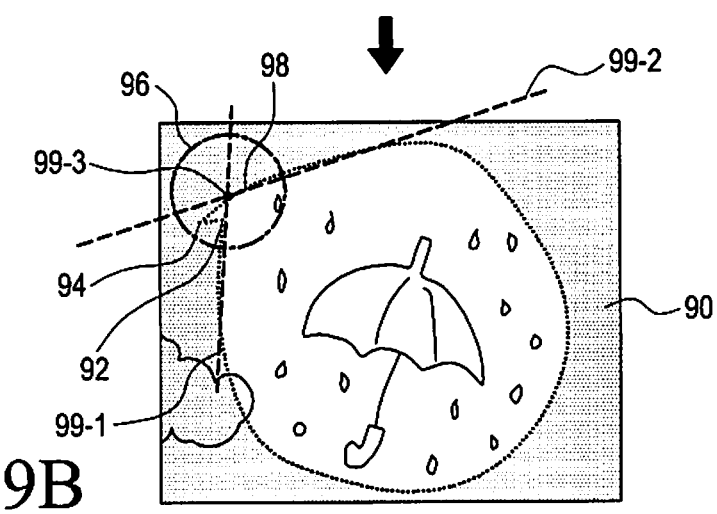
Figure 10B:
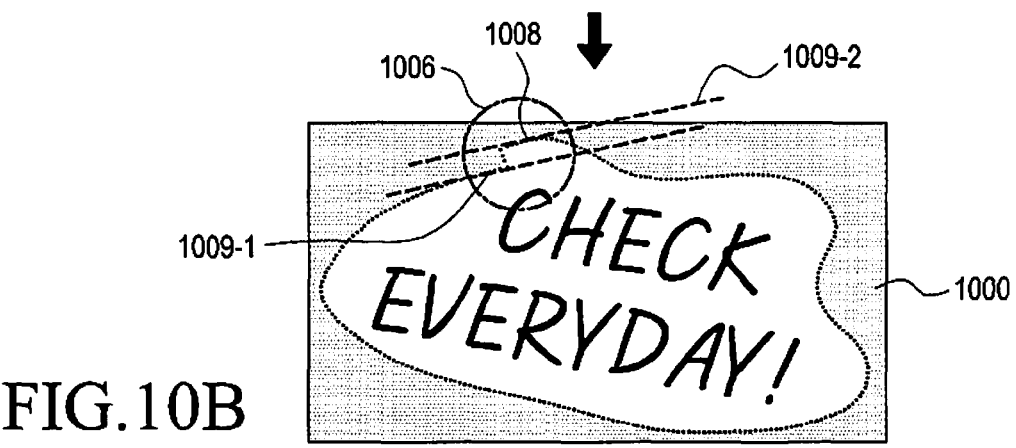

For example, as shown in FIG. 9B, the portable terminal 100 selects a circle 96 with reference to the start point 92 and the end point 94. As another example, as shown in FIG. 10B, the portable terminal 100 selects a circle 1006 with reference to the start point 1002 and the end point 1004. A size of the circle may be determined according to a size of the image and positions of the start point and the end point or a predetermined size.

The portable terminal 100 removes drawing points within the circle in step 830.

For example, as shown in FIG. 9B, the portable terminal 100 entirely removes drawing points 98 within the circle 96. As another example, as shown in FIG. 10B, the portable terminal 100 entirely removes drawing points 1008 within the circle 1006.

The portable terminal 100 performs an operation detecting an intersection point between a slope of a start section and a slope of an end section in step 840.

For example, as shown in FIG. 9B, the portable terminal 100 performs an operation detecting an intersection point 99-3 between a slope 99-1 of a start section and a slope 99-2 of an end section. As another example, as shown in FIG. 10B, the portable terminal 100 performs an operation detecting an intersection point between a slope 1009-1 of a start section and a slope 1009-2 of an end section.

The portable terminal 100 determines whether the intersection point exists within the circle in step 850.

For example, the portable terminal 100 may determine whether the intersection point 99-3 exists in the circle 96 as shown in FIG. 9B and whether the intersection point exists within the circle as shown in FIG. 10B.

When an intersection exists in a circle, the portable terminal 100 adds outline points for smoothly connecting the start point and the end point within the circle using the intersection point in step 860.

Figure 9C:
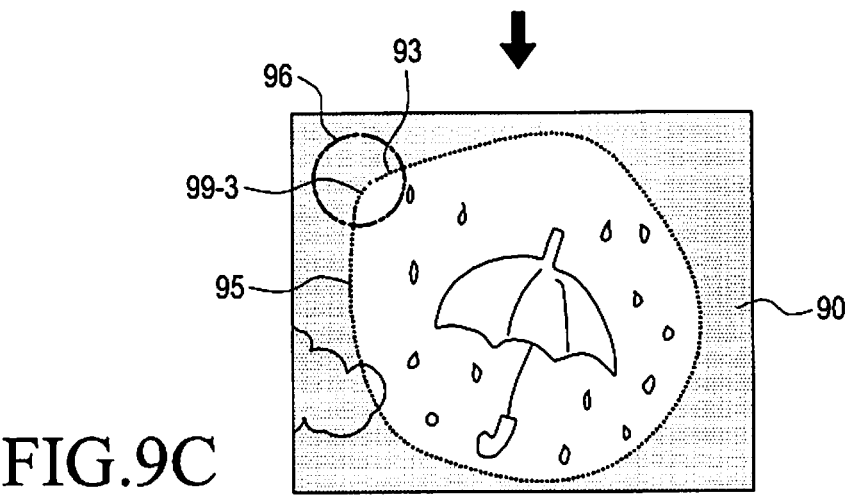

For example, as shown in FIG. 9C, the portable terminal 100 adds points 93 within the circle 96 around the intersection point 99-3 so as to generate a smoothly connected outline 95.

When an intersection point does not exist within a circle, the portable terminal 100 adds outline points as a straight line between points at which the circle meets the original outline in step 870.

Figure 10C:
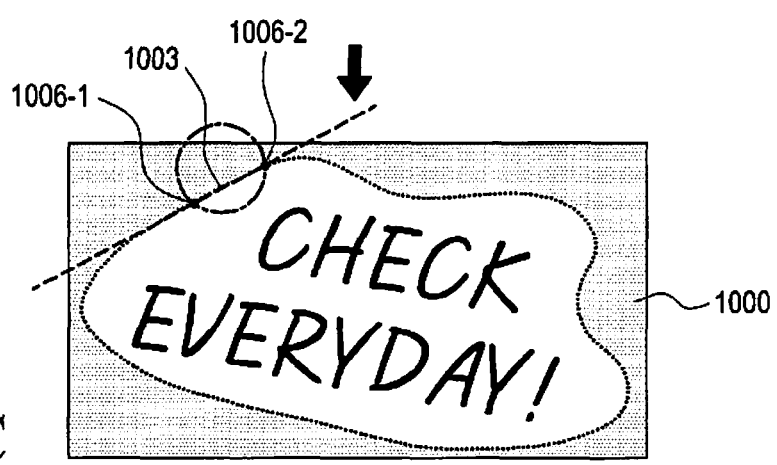
Figures 11A, 11B:
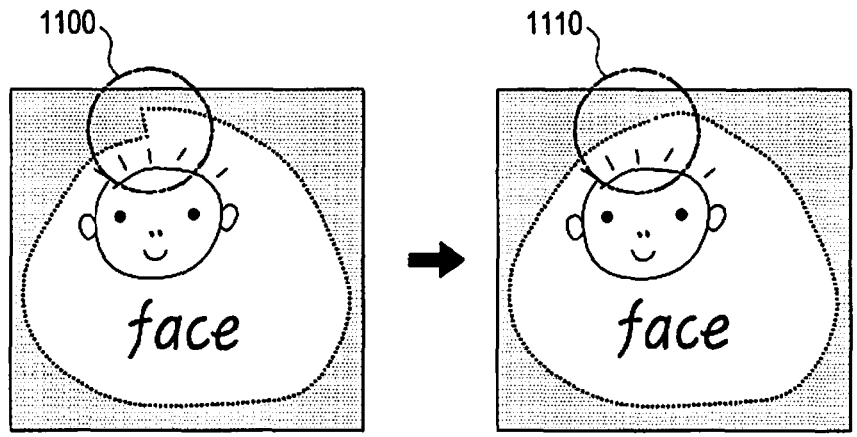
Figure 12A:
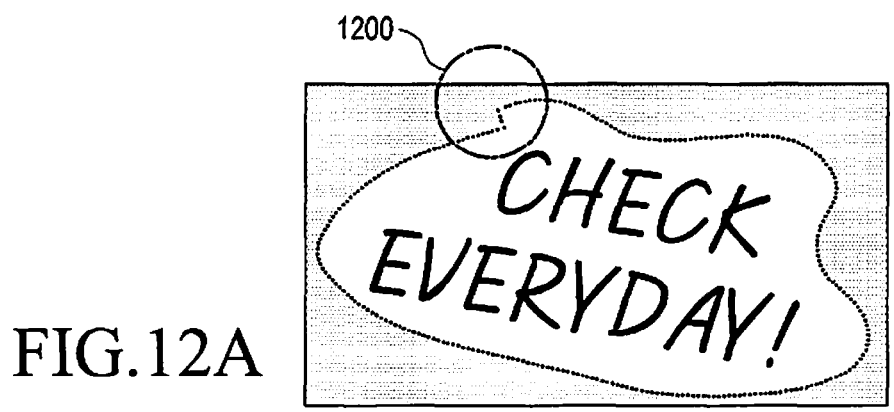
Figure 12B:
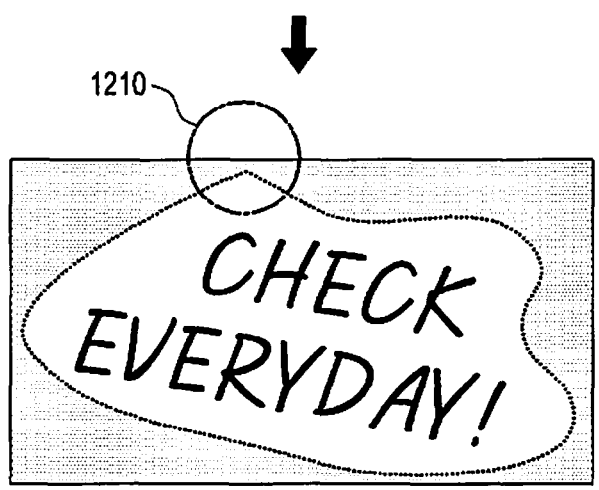

For example, as shown in FIG. 10C, the portable terminal 100 adds points 1003 as a straight line between points 1006-1 and 1006-2 at which the circle 1006 meets an outline so as to generate an outline in which the start point and the end point are smoothly connected.

According to an end point processing operation of step 710 of FIG. 7 as described above, for example, steps 810 to 860 of FIG. 8, the portable terminal 100 allows the start point and the end point of the outline to be smoothly connected.

Figure 14A:
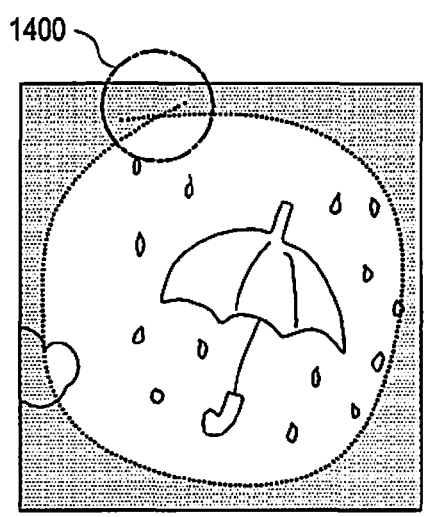
Figure 14B:
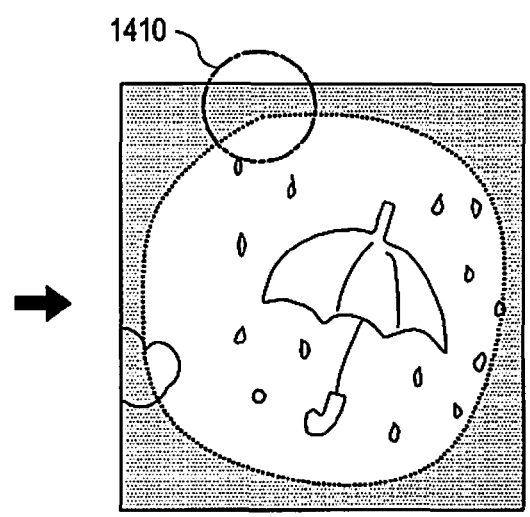

FIGS. 11 to 14 illustrate examples in which an end point is processed according to an embodiment of the present disclosure. Referring to FIGS. 11A and 11B, a part 1100 in which a start point is not smoothly connected to an end point is processed as a part 1110 in which the start point is smoothly connected to the end point by an end point processing operation performance. Referring to FIGS. 12A and 12B, a part 1200 in which a start point is not smoothly connected to an end point is processed as a part 1210 in which the start point is smoothly connected to the end point by an end point processing operation performance. Referring to FIGS. 13A and 13B, a part 1300 in which a start point is not smoothly connected to an end point is processed as a part 1310 in which the start point is smoothly connected to the end point by an end point processing operation performance. Referring to FIG. 14, a part 1400 in which a start point is not smoothly connected to an end point is processed as a part 1410 in which the start point is smoothly connected to the end point by an end point processing operation performance.

Referring back to FIG. 7, the portable terminal 100 calculates an angle of every point with respect to adjacent points forming the outline in step 720 after the end point processing as described above.

Figure 15:
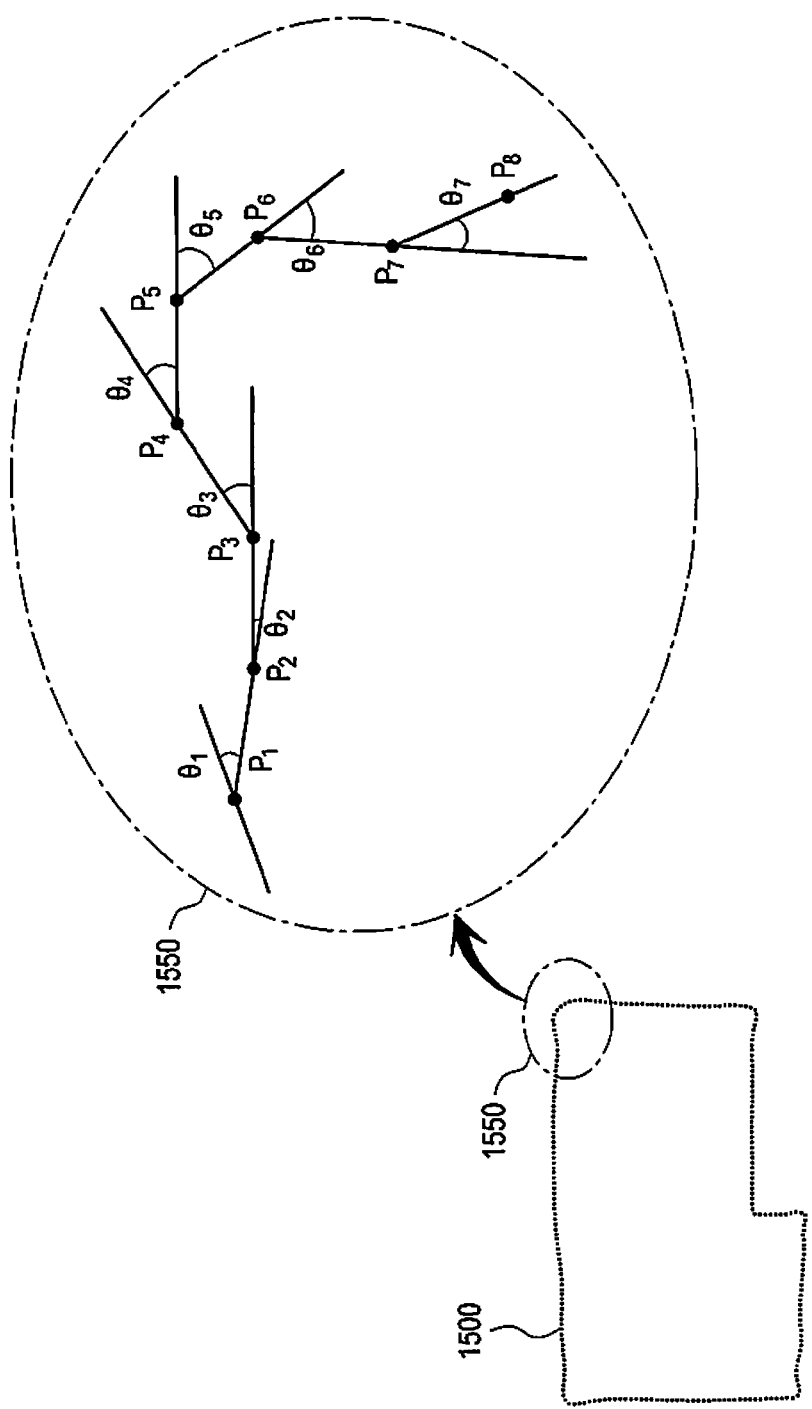
FIG. 15 illustrates an example of an operation of calculating an angle of every point forming an outline according to an embodiment of the present disclosure.

FIG. 15 illustrates an example of an operation of calculating an angle between every adjacent points forming an outline according to an embodiment of the present disclosure. Referring to FIG. 15, the potable terminal 100 calculates an angle of every point with respect to all adjacent points forming an outline 1500. In FIG. 15, a part indicated by reference number 1550 is illustrated as an example. Referring to reference number 1550, the portable terminal 100 calculates angles θ1~θ7 of every points P1 to P8. A θ value may be used to determine the degree of inflection of a corresponding line by a corresponding point among the points forming a line. For example, in FIG. 15, θ7 is to be an angle formed by a line P6-P7 and a line P7-P8.

The portable terminal 100, after calculating angles of every points forming the outline, extracts an inflection point in step 730 and arranges the extracted inflection points to generate a pre-processed outline. For example, as shown in FIG. 15, the portable terminal 100 may extract P5 of which an angle is larger than a predetermined reference value in a predetermined section as an inflection point. Here, the predetermined section is a section within a predetermined distance with reference to a present point or a section including a predetermined number of points with reference to the present point. When the several extracted inflection points are included in a certain section, the portable terminal 100 selects an inflection point which has the largest angle among the several inflection points so as to arrange the extracted inflection points to generate a pre-processed outline.

FIGS. 16A-16B, 17A-17D, and 18A-18D illustrate extracted inflection points and an inflection point arrangement according to an embodiment of the present disclosure.

Figures 16A, 16B:
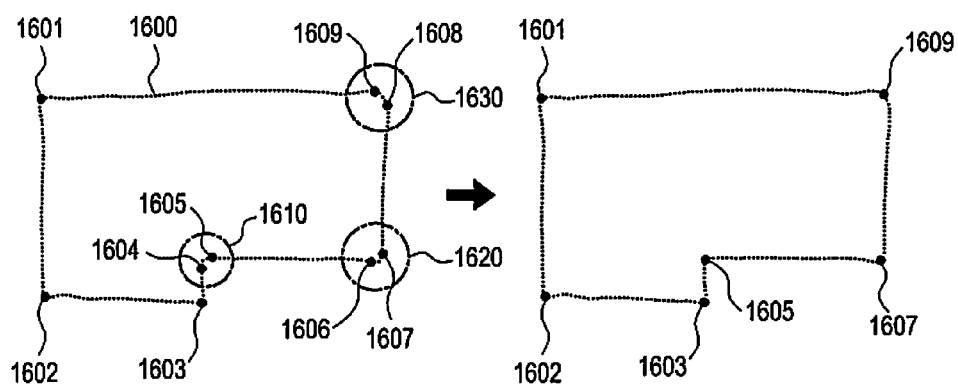
FIGS. 16A-16B, 17A-17D, and 18A-18D illustrate extracted inflection points and an inflection point arrangement according to an embodiment of the present disclosure.

Referring to FIG. 16A, the portable terminal 100 extracts inflection points 1601 to 1609 in which an inflection is large enough, for example, an angle is larger than a predetermined reference value. When a plurality of inflection points are included in a certain section as indicated by reference number 1610 to 1630 among the inflection points, the portable terminal 100 selects an inflection point in which an angle is large enough in each section. For example, as shown in FIG. 16B, the portable terminal 100 selects an inflection point 1605 in which an angle is large enough between inflection points 1604 and 1605 included in a section 1610, selects an inflection point 1607 in which an angle is large enough between inflection points 1606 and 1607 included in a section 1620, and selects an inflection point 1609 in which an angle is large enough between inflection points 1608 and 1609 included in a section 1630.

Figures 17A, 17B:
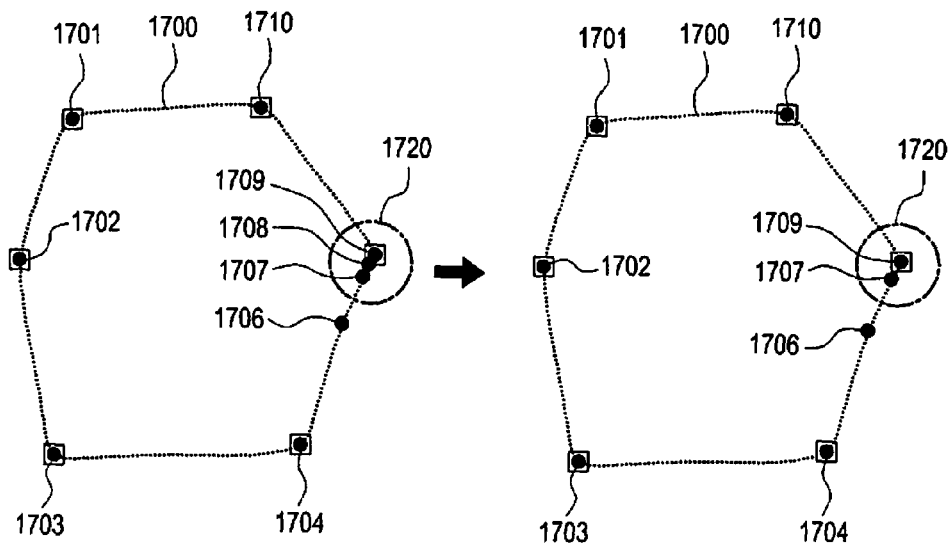
Figures 17C, 17D:
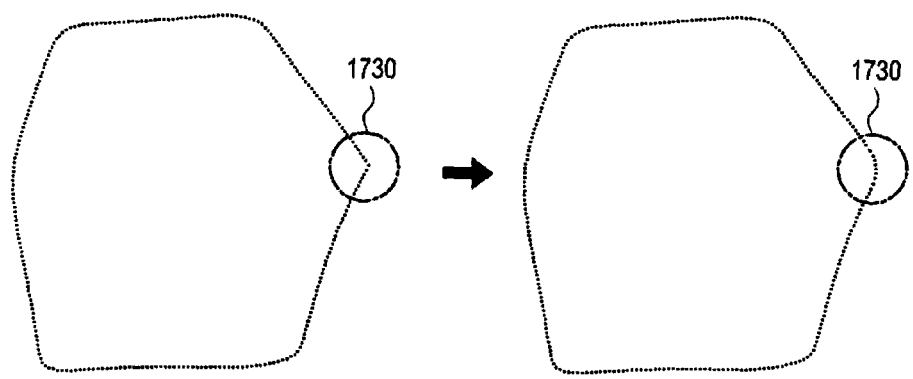

Referring to FIG. 17A, the portable terminal 100 extracts inflection points 1701 to 1710 in which an inflection is large enough, for example, an angle is larger than a predetermined reference value. When a plurality of inflection points 1707 to 1709 are included in a certain section as indicated by reference number 1720 among the inflection points, an inflection point in which the angle is large enough in each section is selected. For example, as shown in FIG. 17B, the portable terminal 100 selects the inflection points 1707 and 1709 in which an angle is large enough among the inflection points 1707 to 1709 included in the section 1720. As described above, the inflection point arrangement is performed so that a pre-processed outline is generated. When a rounding processing is performed in the outline 1700, an outline shape can be generated as an outline shape which is round in a section 1740 as shown in FIG. 17D from an outline shape which is sharp in the section 1730 as shown in FIG. 17C.

Figures 18A, 18B:
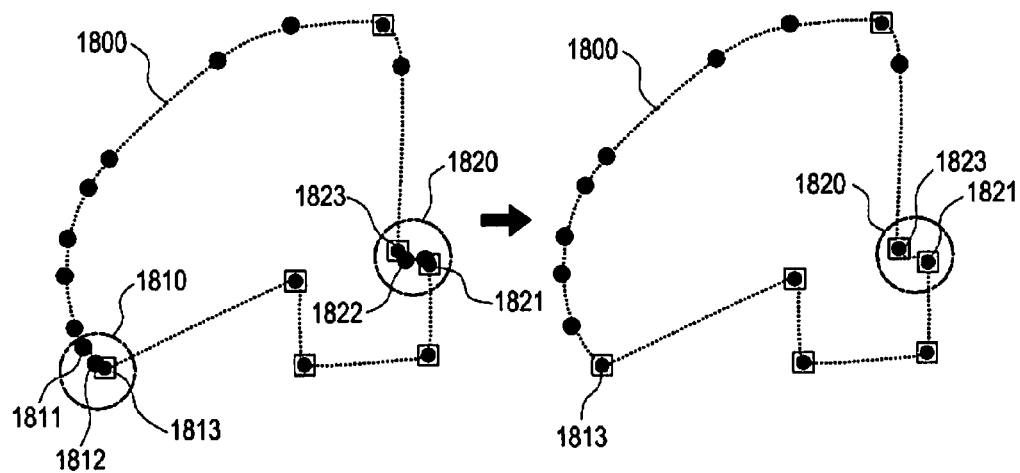
Figures 18C, 18D:
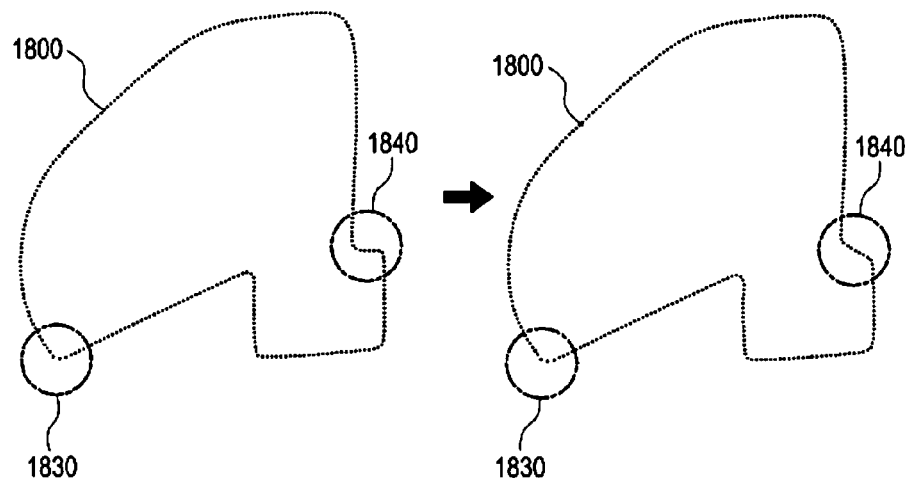

Referring to FIG. 18A, the portable terminal 100 extracts inflection points in which an inflection is large enough, for example, an angle is larger than a predetermined reference value. When a plurality of inflection points are included in a certain section as indicated by reference number 1810 and 1820 among the inflection points, an inflection point in which the angle is large enough in each section is selected. For example, as shown in FIG. 18B, the portable terminal 100 selects an inflection point 1813 in which the angle is large enough among inflection points 1811, 1812, and 1813 included in a section 1810. Further, the portable terminal 100 selects inflection points 1821 and 1823 in which the angle is large enough among the inflection points 1821, 1822, and 1823 included in a section 1820. As described above, the inflection point arrangement is performed so that a pre-processed outline is generated. When a rounding processing is performed in the outline 1800, an outline shape can be generated as an outline shape which is round in sections 1830 and 1840 as shown in FIG. 18D from an outline shape which is sharp in sections 1830 and 1840 as shown in FIG. 18C.

According to the embodiment of the present disclosure, the portable terminal 100 may complete an outline pre-processing operation by extracting and arranging the inflection points with respect to the outline and generate the pre-processed outline as described above.

According to the embodiment of the present disclosure, the pre-processed outline can be corrected according to the outline correction scheme and according to the shape recognition correction scheme.

Figure 19:
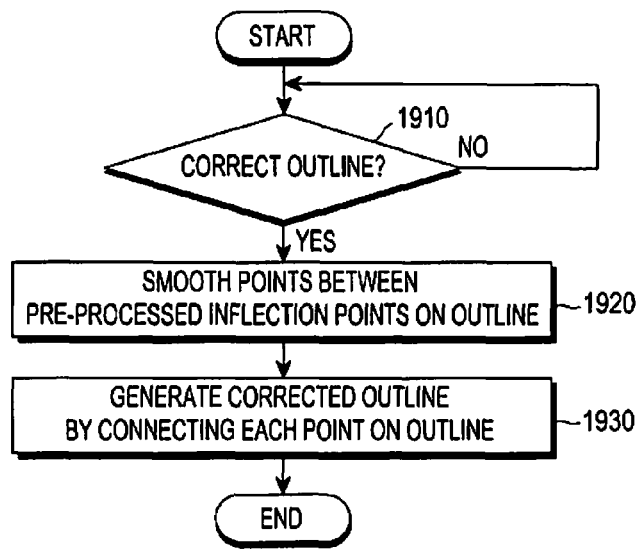
FIG. 19 is a flowchart illustrating an outline correcting operation according to an outline correction scheme according to an embodiment of the present disclosure.

FIG. 19 is a flowchart illustrating an outline correcting operation according to an outline correction scheme according to an embodiment of the present disclosure and FIGS. 20A-20B, 21A-21B, and 22A-22B illustrate examples of an outline correcting operation according to an outline correction scheme according to an embodiment of the present disclosure.

Referring to FIG. 19, the portable terminal 100 determines whether an outline corrected with the outline correction scheme is selected in step 1910. For example, the portable terminal 100 may select the outline correction with the outline correction scheme according to a user's selection and the outline correction with the outline correction scheme according to a predetermined setting condition.

When it has been determined that the outline correction corrected with the outline correction scheme is selected, the portable terminal 100 smoothes points between pre-processed inflection points on the outline in step 1920.

Figures 20A, 20B:
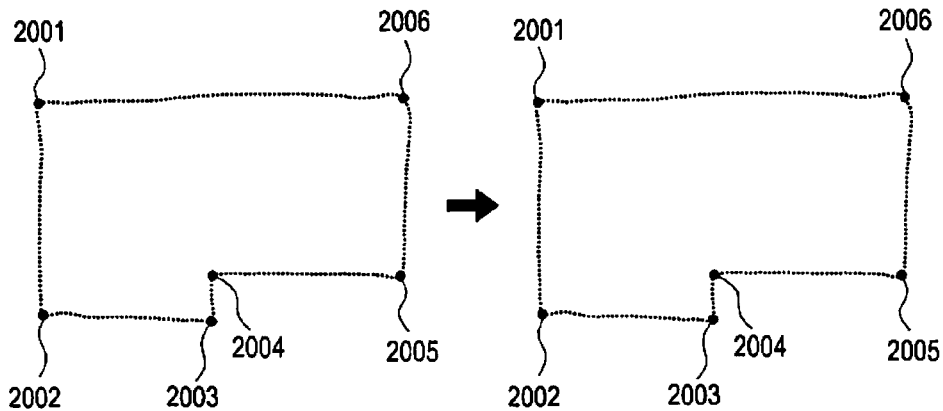
FIGS. 20A-20B, 21A-21B, and 22A-22B illustrate examples of an outline correction operation according to an outline correction scheme according to an embodiment of the present disclosure.

For example, referring to FIG. 20A, when inflection points 2001 to 2006 exist on an outline, the portable terminal 100 smoothes points which exist between the inflection point 2001 and the inflection point 2002. The portable terminal 100 adjusts a coordinate value of each point which exists between the inflection point 2001 and the inflection point 2002 as a value obtained by averaging coordinate values of surrounding pixels so as to smooth points existing between the inflection point 2001 and the inflection point 2002. Similarly, points existing between the inflection point 2002 and the inflection point 2003 can be smoothed, points existing between the inflection point 2003 and the inflection point 2004 can be smoothed, points existing between the inflection point 2004 and the inflection point 2005 can be smoothed, points existing between the inflection point 2005 and the inflection point 2006 can be smoothed, and points existing between the inflection point 2006 and the inflection point 2001 can be smoothed. The points between the inflection points on the outline as described above are smoothed so that the points among the inflection points 2001 to 2006 can be more smoothly presented on the outline as shown in FIG. 20B.

Figures 21A, 21B:
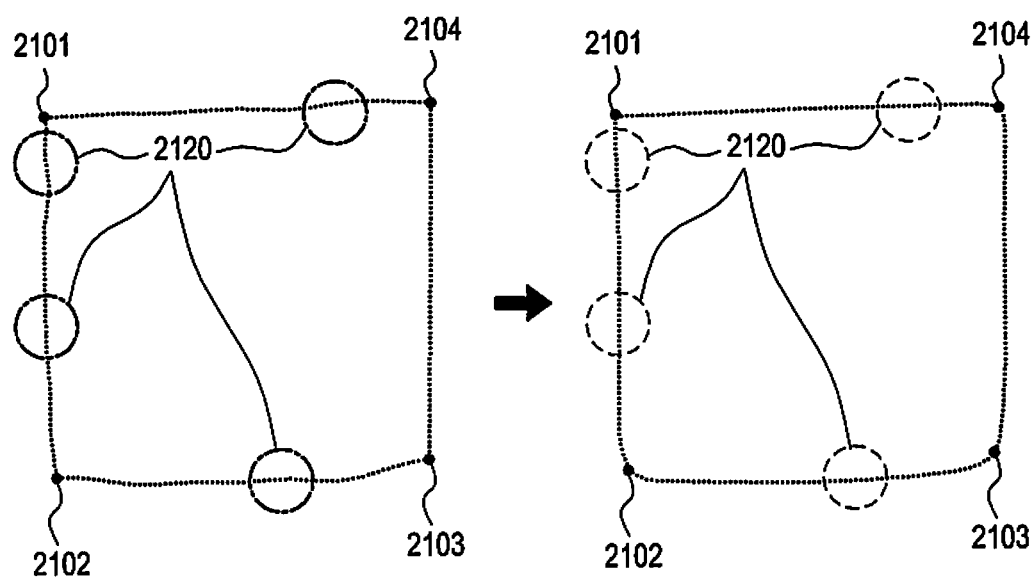
Figures 22A, 22B:
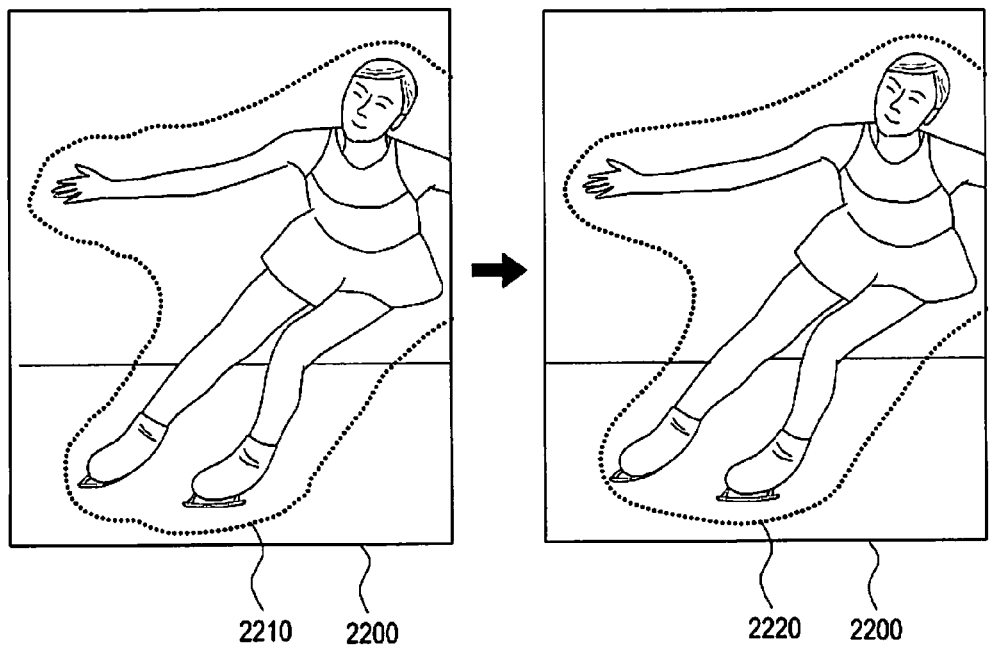

For example, referring to FIG. 21A, when inflection points 2101 to 2104 exist on an outline, the portable terminal 100 smoothes points which exist between the inflection point 2101 and the inflection point 2104. The portable terminal 100 adjusts the coordinate value of each point which exists between the inflection point 2101 and the inflection point 2102 to a value obtained by averaging coordinate values of surrounding pixels so as to smooth points existing between the inflection point 2101 and the inflection point 2102. Similarly, points existing between the inflection point 2102 and the inflection point 2103 can be smoothed, points existing between the inflection point 2103 and the inflection point 2104 can be smoothed, and points existing between the inflection point 2104 and the inflection point 2101 can be smoothed. The points between the inflection points on the outline as described above are smoothed so that parts 2120 which are not smoothed on the outline as shown in FIG. 21A can be presented as parts 2130 which are smoothed as shown in FIG. 21B. Referring to FIG. 22A, in an image 2200 displayed on the touch screen 184, when a pre-processed outline 2210 corrected according to the outline correction scheme is selected when the pre-processed outline 2210 is displayed, the pre-processed outline 2210 may be corrected and displayed as a smoothed outline 2220 as shown in FIG. 22B.

According to the embodiment of the present disclosure, when a outline drawn by the user is not smooth, the outline is corrected to be smooth so that the image can be cropped along a smoothed outline.

According to an embodiment of the present disclosure, the pre-processed outline may be corrected according to the shape recognition correction scheme.

Figure 23:
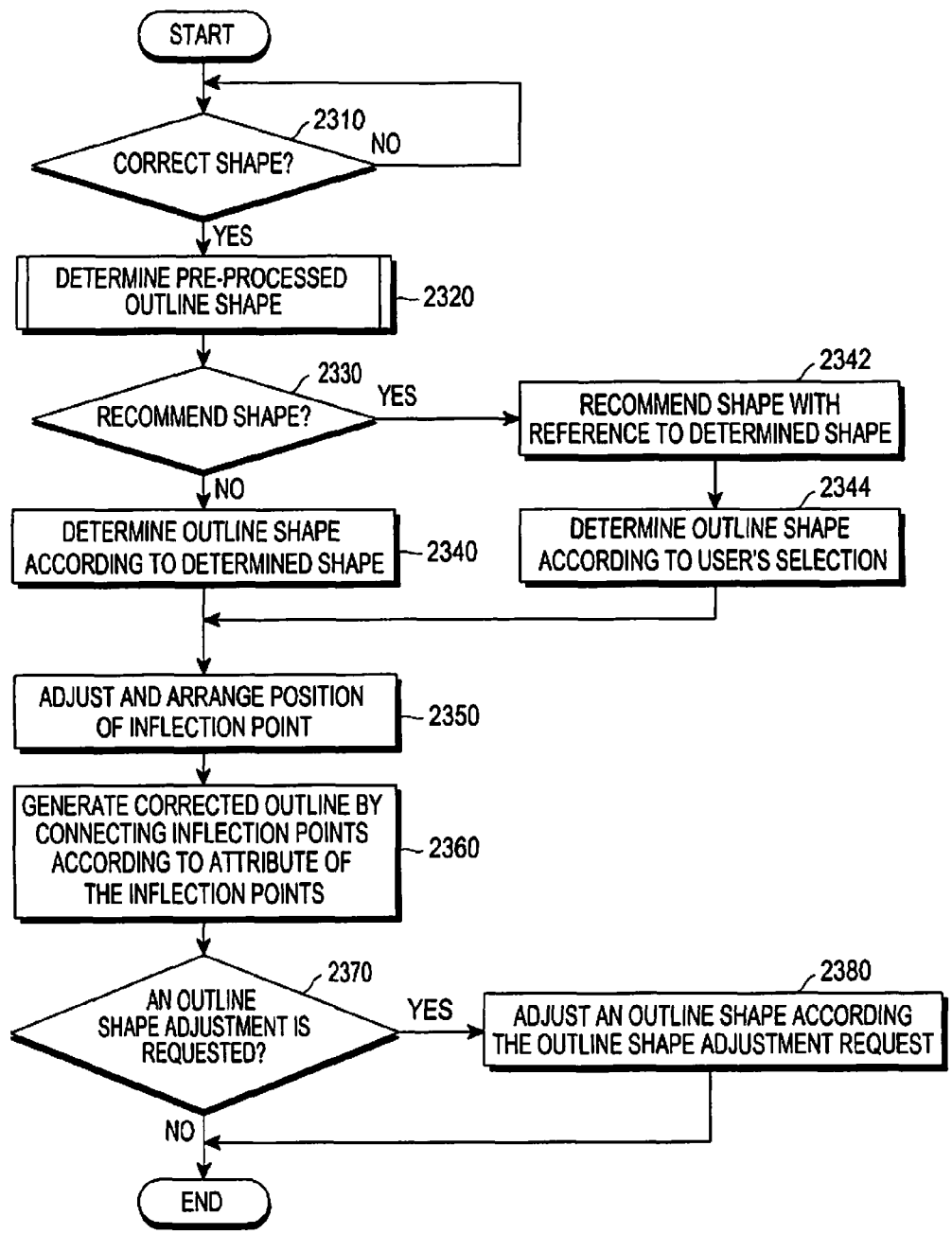
FIG. 23 is a flowchart illustrating an outline correction operation according to a shape recognition correction scheme according to an embodiment of the present disclosure.

FIG. 23 is a flowchart illustrating an outline correction operation according to a shape recognition correcting scheme according to an embodiment of the present disclosure. Referring to FIG. 23, the portable terminal 100 may determine whether an pre-processed outline corrected with a shape recognition correction scheme is selected in step 2310. For example, the portable terminal 100 may select a correction with the shape recognition correction scheme according to a user's selection and a correction with the shape recognition correction scheme according to a predetermined setting condition.

When it has been determined that the outline corrected with the shape recognition correction scheme is selected, the portable terminal 100 determines the pre-processed outline shape in step 2320.

FIGS. 24A-24D illustrate examples of an outline shape according to an embodiment of the present disclosure. Step 2320 of FIG. 23 will be described in more detail with respect to FIG. 25. That is, FIG. 25 is a flowchart illustrating a pre-processed outline shape determining operation according to an embodiment of the present disclosure. The portable terminal 100 may determine a pre-processed outline shape according to a number of the inflection points and whether a curve line section exists.

Figure 24A:
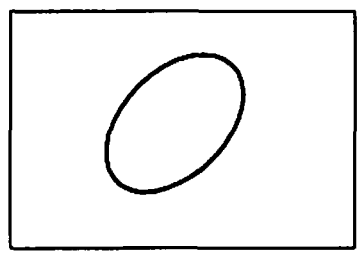
FIGS. 24A-24D illustrate examples of an outline shape according to an embodiment of the present disclosure.
Figure 24B:
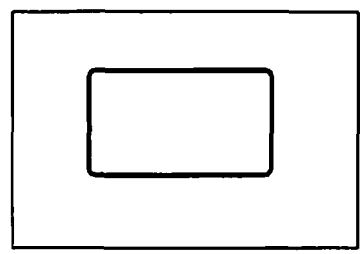
Figure 24C:
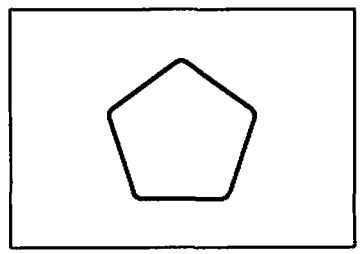
Figure 24D:
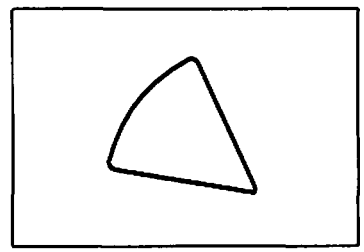
Figure 25:
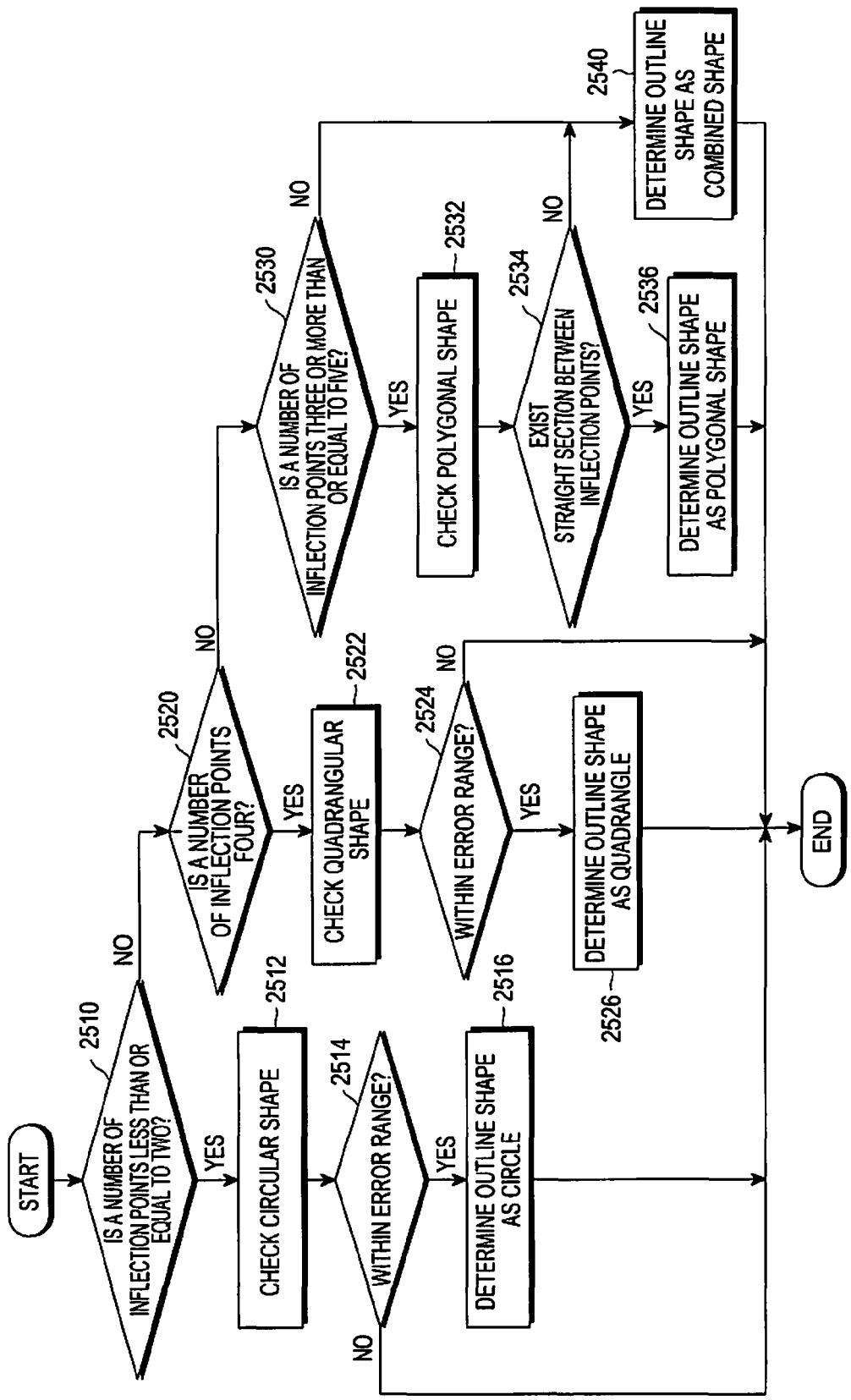
FIG. 25 is a flowchart illustrating a pre-processed outline shape determining operation according to an embodiment of the present disclosure.

Referring to FIGS. 24 A-24D, the portable terminal 100 may determine whether a pre-processed outline shape is a circular shape as shown in FIG. 24A, whether a pre-processed outline shape is a quadrangular shape as shown in FIG. 24B, whether a pre-processed outline shape is a polygonal shape as shown in FIG. 24C, and whether a pre-processed outline shape is a combined shape as shown in FIG. 24D.

Referring to FIG. 25, the portable terminal 100 determines whether inflection points on a pre-processed outline are fewer than or equal to two in step 2510.

When inflection points on an outline are fewer than or equal to two, the portable terminal 100 checks a circular shape in step 2512. For example, the portable terminal 100 may check a circular shape using a fit ellipse model and check a circular shape using RANdom SAmple Consensus (RANSAC) scheme. Besides, another scheme of checking whether an outline is a circular shape may be used.

Figure 26A:
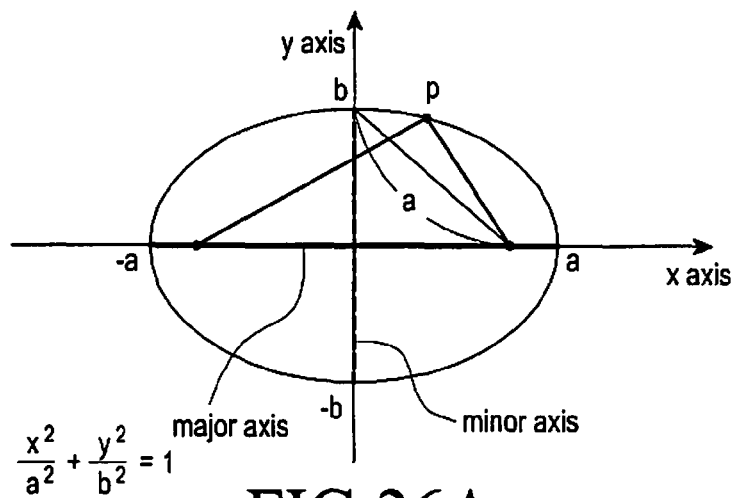
FIGS. 26A-26C illustrate a circular shape checking method using a fit ellipse model according to an embodiment of the present disclosure.
Figure 26B:
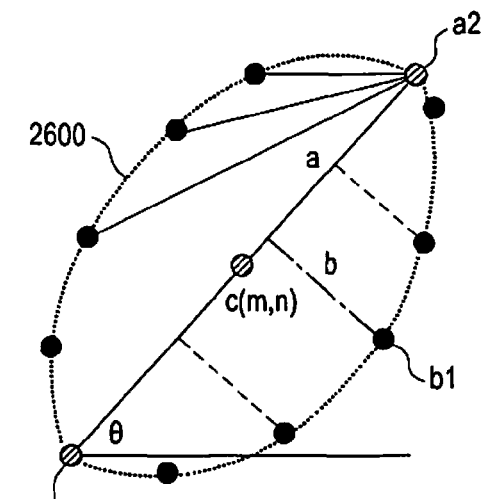
Figure 26C:
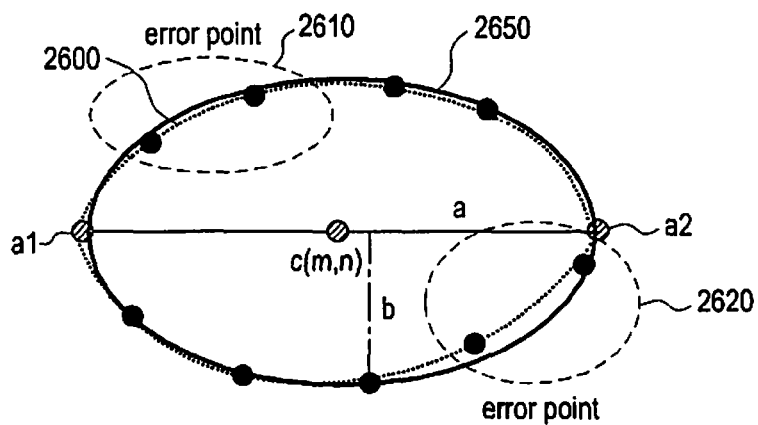

FIGS. 26A-26C illustrate a circular shape checking method using a fit ellipse model according to an embodiment of the present disclosure. FIGS. 27A-27B illustrate a circular shape checking method using a RANSAC scheme according to an embodiment of the present disclosure.

Referring to FIG. 26A, the portable terminal 100 may check a circular shape using the Elliptic Equations. As shown in FIG. 26B, the portable terminal 100 may find two points, for example, a1 and a2 which have the farthest distance on an outline 2600 and find a central point c(m, n) of a1 and a2 so as to calculate half of a length of a major axis as a major radius a. In addition, the potable terminal 100 calculates a slope θ with reference to the major axis of the outline 2600 and calculates a distance between other points on the outline except for a1 and a2 and the major axis so as to find a point b1 having the longest distance b. b may be half of a length of a minor axis as a minor radius. The portable terminal 100 may rotate the outline 2600 using the slope θ of the outline 2600 and generate an ellipse 2650 using the major radius a and the minor radius b with reference to the rotated outline 2600 as shown in FIG. 26C. The portable terminal 100 may check the circular shape by comparing whether points on the outline 2600 overlay with the generated ellipse 2650. For example, the portable terminal 100 may determine error points 2610 and 2620 on the outline 2600 as points which do not overlay with the ellipse 2650 and determine remaining points as points which overlay with the ellipse 2650.

Referring to FIG. 27A, the portable terminal 100 may extract five arbitrary points from ten arbitrary points on an outline 2700 so as to check a circular shape with respect to the outline 2700 using a RANSAC algorithm as shown in FIG. 27B with reference to the five arbitrary points from ten arbitrary points. The portable terminal 100 may check the circular shape either selectively using one of the circular shape checking based on the fit ellipse model as shown in FIGS. 26A-26C and the circular shape checking based on the RANSAC scheme, or using a scheme showing a result having fewer errors among the circular shape checking methods.

Referring back to FIG. 25, the portable terminal 100 determines whether a result of the circular shape checking is within a predetermined error range in step 2514, as a result of the circular shape checking as described above. For example, when the number of error points 2610 and 2620 of FIG. 26 are within predetermined number, the portable terminal 100 may determine that a result of the circular shape checking is within the predetermined error range. Further, when the number of error points 2610 and 2620 of FIG. 26 are greater than or equal to the predetermined number, the portable terminal 100 may determine that a result of the circular shape checking is not within the predetermined error range.

When the result of the circular shape checking is within the predetermined error range, the portable terminal 100 determines an outline shape as a circular shape in step 2516. When the result of the circular shape checking is not within the predetermined error range, the portable terminal 100 terminates the circular shape checking.

When the pre-processed inflection points on the outline are not less than or equal to two, the portable terminal 100 determines whether inflection points are four in step 2520.

When the number of inflection points on an outline are four, the portable terminal 100 checks a quadrangular shape in step 2522. For example, the portable terminal 100 may generate a quadrangle by connecting the four inflection points and check whether the outline is a quadrangular shape.

The portable terminal 100 determines whether the generated quadrangle is a quadrangle within a predetermined error range in step 2524. When the generated quadrangle is the quadrangle within a predetermined error range, the portable terminal 100 determines the outline shape as a quadrangle in step 2526. When the result of the quadrangular shape checking is not within the predetermined error range, the portable terminal 100 terminates the quadrangular shape checking.

When the number of the pre-processed inflection points on the outline is not less than or equal to two and are not four, the portable terminal 100 determines whether the number of the inflection points is three or more than or equal to five in step 2530.

When the number of the inflection points on the pre-processed outline are three or more than or equal to five, the portable terminal 100 checks that the outline is a polygon in step 2532 and determines whether only straight line sections exist between the inflection points in step 2534. Step 2534 is illustrated with respect to FIGS. 28A-28B as examples of polygon-shaped outlines according to an embodiment of the present disclosure.

Figure 28A:
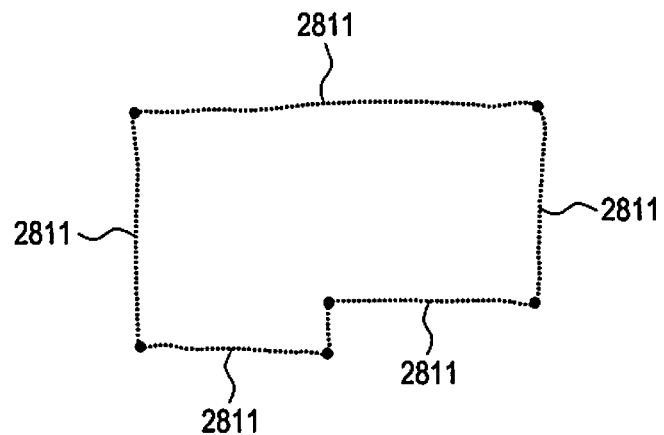
FIGS. 28A-28B illustrate outlines of a polygonal shape according to an embodiment of the present disclosure.

Referring to FIG. 28A, when only straight line sections 2811 exist between the adjacent inflection points among six inflection points, the portable terminal 100 determines an outline shape as a polygon in step 2536.

Figure 28B:
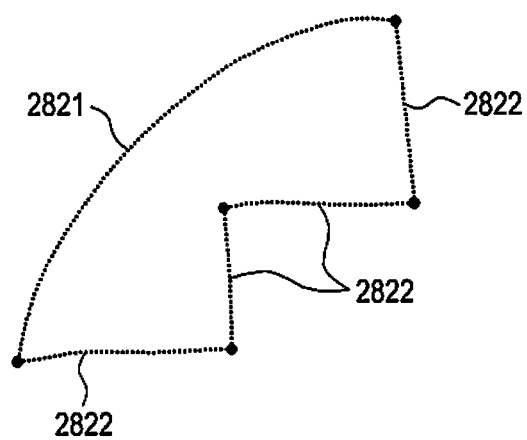

When not only straight line sections 2822 but also a curve line section 2821 exists between the adjacent inflection among five inflection points as shown in FIG. 28B, the portable terminal 100 determines an outline shape as a combined shape in step 2540. The combined shape may be a shape in which a curve line section and a straight line section exist.

Referring back to FIG. 23, the portable terminal 100 determines whether the outline shape is the circular shape, the quadrangular shape, the polygonal shape, and the combined shape as described above, and then determines existence or non-existence of a shape recommendation in step 2330. The existence or non-existence of the shape recommendation may be selected according to a selection of a user or be previously set.

When the shape is not recommended, the portable terminal 100 determines a determined outline shape as the outline shape in step 2340. When the shape is recommended, the portable terminal 100 recommend a shape based on the determined shape in step 2342.

FIGS. 29A-29C, 30A-30E, 31A-31D, and 32A-32E illustrate step 2342 according to an embodiment of the present disclosure.

Figure 29A:
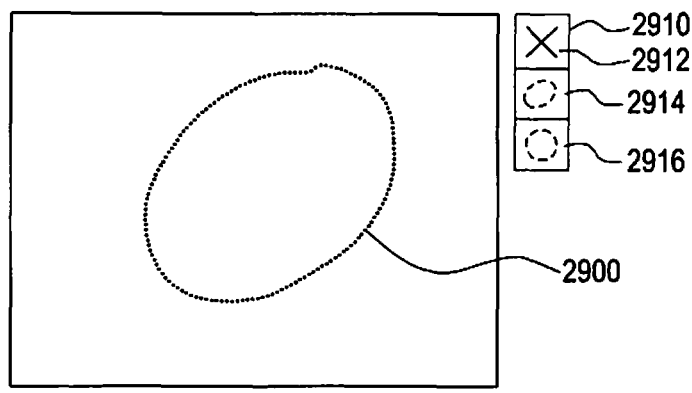
Figure 29B:
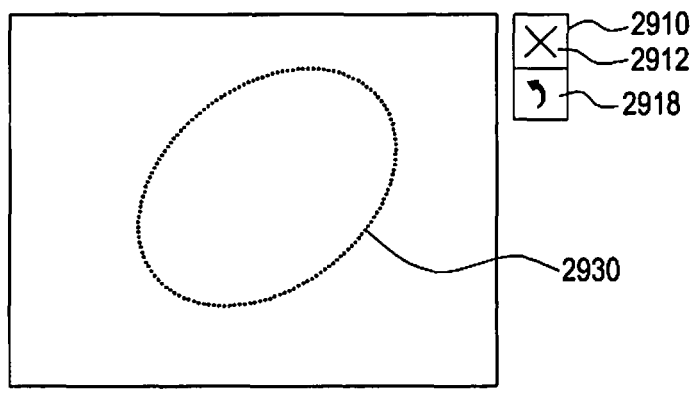
Figure 29C:
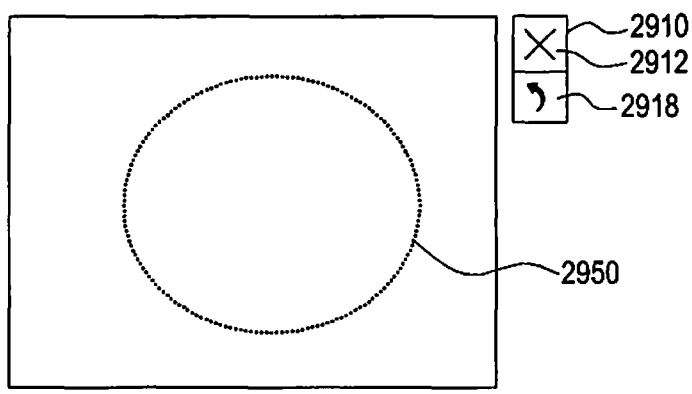

Referring to FIG. 29A, when a pre-processed outline shape 2900 is determined as a circular shape, the portable terminal 100 displays a selection bar 2910 for recommending a shape related to a circular shape. In the selection bar 2910, a selection bar off 2912 which makes the selection bar 2910 disappear from a screen, a first recommended shape 2914 which represents an ellipse, and a second recommended shape 2916 which represents an circle may be displayed. It is apparent that other recommended shapes other than the first recommended shape 2914 and the second recommended shape 2916 may be additionally displayed. The user may select an outline shape which the user wants in the selection bar 2910. For example, when the first recommended shape 2914 which represents an ellipse has been selected by the user, the portable terminal 100 may change and display the outline shape 2900 into an ellipse 2930 as shown in FIG. 29B and make a cancellation 2918 which cancels a shape change to be displayed on the selection bar 2910. For example, when the second recommended shape 2916 which represents a circle has been selected by the user, the portable terminal 100 may change and display the outline shape 2900 into a circle 2950 as shown in FIG. 29C and make the cancellation 2918 which cancels a shape change to be displayed on the selection bar 2910.

Figures 30A, 30B, 30C, 30D, 30E:
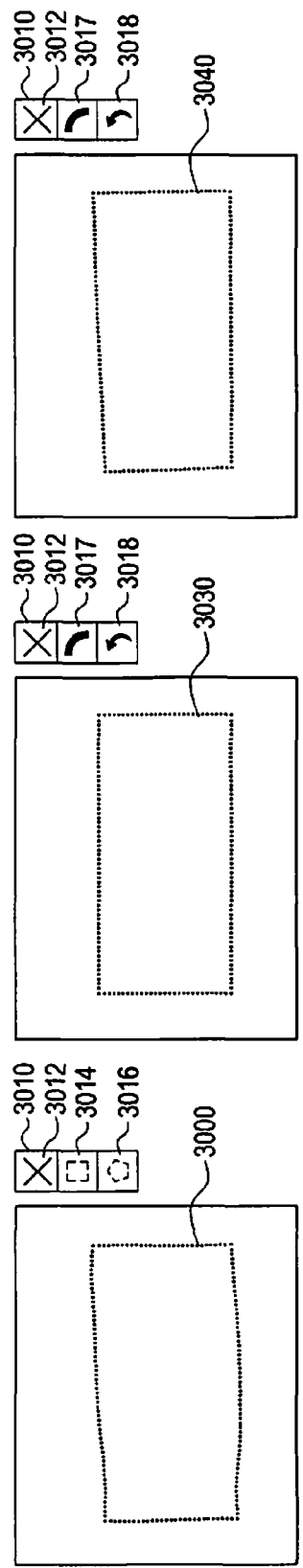

Referring to FIG. 30A, when a pre-processed outline shape 3000 is determined as a quadrangular shape, the portable terminal 100 may display a selection bar 3010 for recommending a shape related to a quadrangular shape. In the selection bar 3010, a selection bar off 3012 which makes the selection bar 3010 disappear from a screen, a first recommended shape 3014 which represents a rectangle, and a second recommended shape 3016 which represents a polygon may be displayed. It is apparent that one or more other recommended shapes other than the first recommended shape 3014 and the second recommended shape 3016 may be additionally displayed.

The user may select an outline shape which the user wants in the selection bar 3010. For example, when the first recommended shape 3014 which represents a rectangle has been selected by the user, the portable terminal 100 may change and display the outline shape 3000 into a rectangle 3030 as shown in FIG. 30B and make a cancellation 3018 which cancels a shape change to be displayed on the selection bar 3010. A rounding shape 3017 for rounding an edge of the outline may be further displayed on the selection bar 3010.

For example, when the second recommended shape 3016 which represents a polygon has been selected by the user, the portable terminal 100 may change and display the outline shape 3000 into a quadrangle 3040 as shown in FIG. 30C and make the cancellation 3018 which cancels a shape change to be displayed on the selection bar 3010. A rounding shape 3017 for rounding an edge may be further displayed on the selection bar 3010.

When a rectangle-shaped outline 3030 is displayed as shown in FIG. 30B and the rounding shape 3017 has been selected by the user, the portable terminal 100 may display a rounded rectangle 3050 as shown in FIG. 30D, and display, on the selection bar 3010, the cancellation 3018 which cancels a shape change, and an edge shape 3019 which cancels the rounding processing and changes the edge shape into an original edge shape. When the edge shape 3019 has been selected by the user when the rounded rectangle 3050 is displayed as shown in FIG. 30D, the portable terminal 100 may display the rectangle-shaped outline 3030 as shown in FIG. 30B.

When a quadrangle-shaped outline 3040 is displayed as shown in FIG. 30C and the rounding shape 3017 has been selected by the user, the portable terminal 100 may display a rounded polygon 3060 as shown in FIG. 30E, and display, on the selection bar 3010, the cancellation 3018 which cancels a shape change, and an edge shape 3019 which cancels the rounding processing and changes the edge shape into an original edge shape. When the edge shape 3019 has been selected by the user when the rounded polygon 3060 is displayed as shown in FIG. 30E, the portable terminal 100 may display the polygon-shaped outline 3040 as shown in FIG. 30C.

Figure 31C:
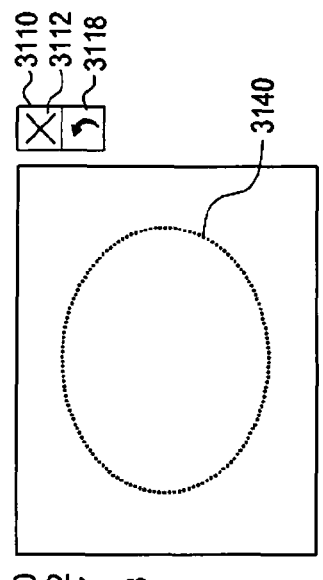
Figure 31B:
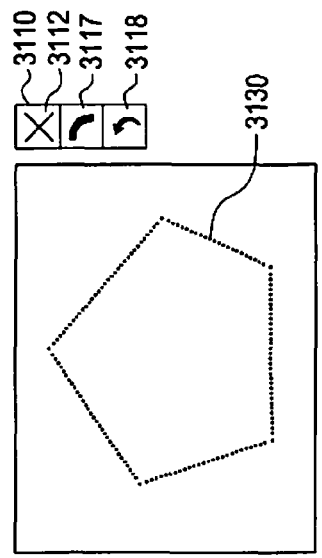
Figure 31D:
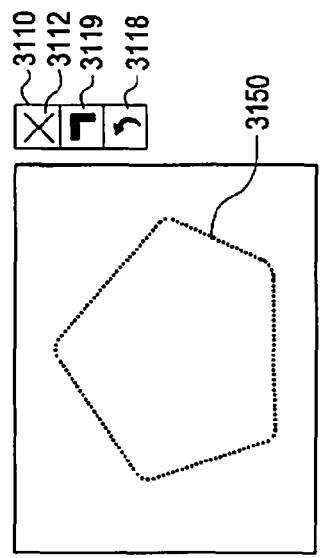
Figure 31A:
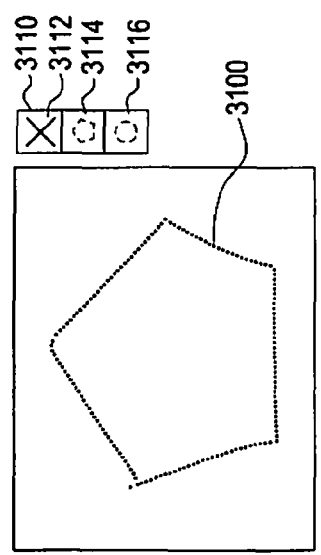

Referring to FIG. 31A, when a pre-processed outline shape 2900 is determined as a polygonal shape, the portable terminal 100 may display a selection bar 3110 for recommending a shape related to a polygonal shape. In the selection bar 3110, a selection bar off 3112 which makes the selection bar 3110 to disappear from a screen, a first recommended shape 3114 which represents a polygon, and a second recommended shape 3116 which represents a circle may be displayed. It is apparent that one or more other recommended shapes other than the first recommended shape 3114 and the second recommended shape 3116 may be additionally displayed.

The user may select an outline shape which the user wants in the selection bar 3110. For example, when the first recommended shape 3114 which represents a polygon has been selected by the user, the portable terminal 100 may change and display the outline shape 3100 into a polygon 3130 as shown in FIG. 31B and make a cancellation 3118 which cancels a shape change to be displayed on the selection bar 3110. A rounding shape 3117 for rounding an edge of the outline may be further displayed on the selection bar 3110.

For example, when the second recommended shape 3116 which represents a circle has been selected by the user, the portable terminal 100 may change and display the outline shape 3100 into a circle 3140 as shown in FIG. 31C and make the cancellation 3118 which cancels a shape change to be displayed on the selection bar 3110.

When a polygon-shaped outline 3130 is displayed as shown in FIG. 31B and the rounding shape 3117 has been selected by the user, the portable terminal 100 may display a rounded polygon 3150 as shown in FIG. 31D, and display, on the selection bar 3010, the cancellation 3118 which cancels a shape change, and an edge shape 3119 which cancels the rounding processing and changes the edge shape into an original edge shape. When the edge shape 3119 has been selected by the user when the rounded polygon 3150 is displayed as shown in FIG. 31D, the portable terminal 100 may display the polygon-shaped outline 3130 as shown in FIG. 31B.

Referring to FIG. 32A, when a pre-processed outline shape 3200 is determined as a combined shape, the portable terminal 100 may display a selection bar 3210 for recommending a shape related to a combined shape. In the selection bar 3210, a selection bar off 3210 which makes the selection bar 3212 disappear from a screen, a first recommended shape 3213 which represents a combined shape, a second recommended shape 3214 which represents a polygon, a third recommended shape 3215 which represents a circle, and a fourth recommended shape 3216 which represents a rectangle may be displayed. It is apparent that one or more other recommended shapes other than the first recommended shape 3213 to the fourth recommended shape 3216 may be additionally displayed.

The user may select an outline shape which the user wants in the selection bar 3210. For example, when the first recommended shape 3213 which represents a combined shape has been selected by the user, the portable terminal 100 may change and display the outline shape 3200 into a combined shape 3230 as shown in FIG. 32B and make a cancellation 3218 which cancels a shape change to be displayed on the selection bar 3210. A rounding shape 3217 for rounding an edge of the outline may be further displayed on the selection bar 3210.

For example, when the second recommended shape 3214 which represents a polygon has been selected by the user, the portable terminal 100 may change and display the outline shape 3200 into a polygon 3240 as shown in FIG. 30C and make the cancellation 3218 which cancels a shape change. A rounding shape 3217 which rounds an edge of the outline may be displayed on the selection bar 3210.

When the combination-shaped outline 3230 is displayed as shown in FIG. 32B and the rounding shape 3217 has been selected by the user, the portable terminal 100 may display a combined shape 3250 as shown in FIG. 32D, and display, on the selection bar 3210, the cancellation 3218 which cancels a shape change, and an edge shape 3219 which cancels the rounding processing and changes the edge shape into an original edge shape. When the edge shape 3219 has been selected by the user when the rounded combined shape 3250 is displayed as shown in FIG. 32D, the portable terminal 100 may display the combination-shaped outline 3230 as shown in FIG. 32B.

When the polygon-shaped outline 3240 is displayed as shown in FIG. 32C and the rounding shape 3217 has been selected by the user, the portable terminal 100 may display a rounded combined shape 3260 as shown in FIG. 32E, and display, on the selection bar 3210, the cancellation 3218 which cancels a shape change, and an edge shape 3219 which cancels the rounding processing and changes the edge shape into an original edge shape. When the edge shape 3219 has been selected by the user in a state in which the rounded combined shape 3260 is displayed as shown in FIG. 32E, the portable terminal 100 may display the polygon-shaped outline 3240 as shown in FIG. 32C.

FIGS. 33A-33C and 34A-34D illustrate a display scheme of a selection bar for a shape recommendation according to an embodiment of the present disclosure.

Referring to FIG. 33A, the portable terminal 100 displays a selection bar off 3312 which makes a selection bar 3310 disappear from a screen, a first recommended shape 3314, and a second recommended shape 3316. Then, when one shape between the first recommended shape 3314 and the second recommended shape 3316 has been selected, the portable terminal 100 may make a cancellation 3318 which cancels a shape change to be displayed on the selection bar 3310 as shown in FIG. 33B. When the cancellation 3318 has been selected on the selection bar 3310 as shown in FIG. 33B, the portable terminal 100 may allow the first recommended shape 3314 and the second recommended shape 3316 to be displayed as shown in FIG. 33C. In other words, it may be switched to display a selection bar for the shape recommendation and a selection bar for the cancellation.

Referring to FIG. 34A, the portable terminal 100 displays a selection bar off 3412, which makes a selection bar 3410 disappear from a screen and a first recommended shape 3314. When the first recommended shape 3414 has been selected, the portable terminal 100 may make a second recommended shape 3416 to be displayed on the selection bar 3410 as shown in FIG. 34B. When the second recommended shape 3416 has been selected on the selection bar 3410 as shown in FIG. 34B, the portable terminal 100 may allow a cancellation 3418 to be displayed as shown in FIG. 34C. When the cancellation 3418 has been selected on the selection bar 3410 as shown in FIG. 34C, the portable terminal 100 may again display the first recommended shape 3414 as shown in FIG. 34D. In other words, it may be sequentially switched to display a selection bar for recommending the first shape, a selection bar for recommending the second shape, and a selection bar for a cancellation. Besides examples of FIGS. 33A-33C and 34A-34D, all selectable shapes and the cancellation may be displayed on the selection bar. A display scheme of the selection bar can be changed into various schemes.

Referring back to FIG. 23, the portable terminal 100 determines the outline shape as a shape selected by the user among the recommended shapes in step 2344.

When the outline shape has been determined through step 2340 or step 2344, the portable terminal 100 performs adjustment and arrangement of positions of points on the outline according to the determined outline shape in step 2350.

FIGS. 35A-35C, 36A-36B and 37A-37C illustrate examples of an operation of adjusting and arranging positions of points on an outline according to an embodiment of the present disclosure. Referring to FIG. 35A, when an outline shape has been determined as a polygon, the portable terminal 100 may remove points among inflection points 3501 to 3506 as shown in FIG. 35B and allow points to be arranged in a shape of a straight line connecting adjacent inflection points among the inflection points 3501 to 3506 as shown in FIG. 35C.

Figures 36A, 36B:
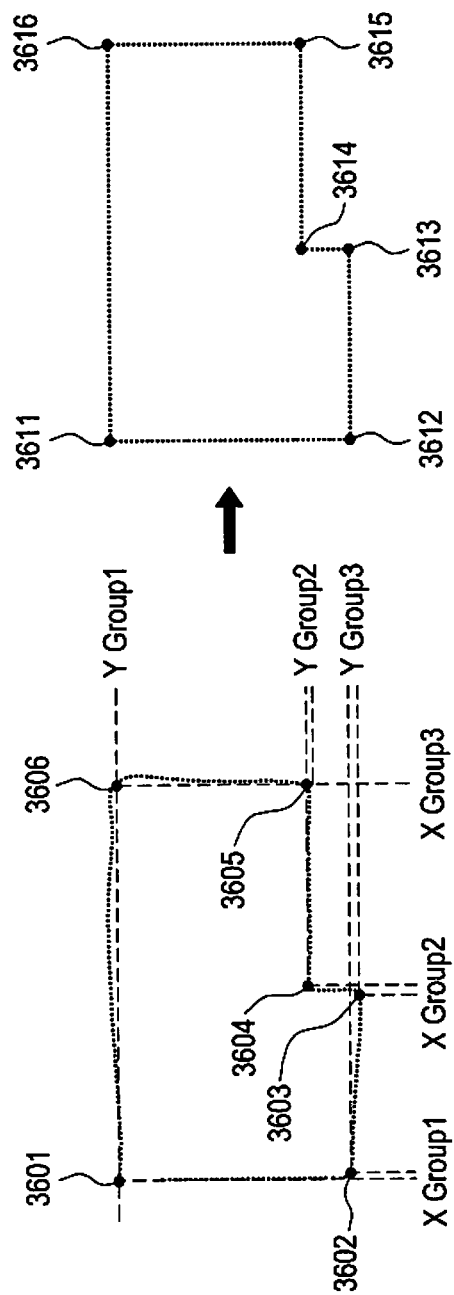

Referring to FIG. 36A, when the outline shape is determined as a polygon, the portable terminal 100 adjusts coordinates of inflection points by using clustering and then arranges points in a shape of a straight line connecting adjacent inflection points among the adjusted inflection points as shown in FIG. 36B. Specifically, for example, the portable terminal 100 may set X-direction clusters X Group 1, X Group 2, and X Group 3 and Y-direction clusters Y Group 1, Y Group 2, and Y Group 3 with respect to the X-direction and the Y-direction, respectively, as shown in FIG. 36A and equally adjust coordinates of inflection points belonging to an identical cluster. For example, since an inflection point 3601 and an inflection point 3606 belong to an identical Y Group 1 cluster, the portable terminal 100 may equally adjust Y coordinates of the inflection point 3601 and the inflection point 3606. Since an inflection point 3604 and an inflection point 3605 belong to an identical Y Group 2 cluster, the portable terminal 100 may equally adjust Y coordinates of the inflection point 3604 and the inflection point 3605. Since an inflection point 3602 and an inflection point 3603 belong to an identical Y Group 3 cluster, the portable terminal 100 may equally adjust Y coordinates of the inflection point 3602 and the inflection point 3603. Meanwhile, since the inflection point 3601 and the inflection point 3602 belong to an identical X Group 1 cluster, the portable terminal 100 may equally adjust X coordinates of the inflection point 3601 and the inflection point 3602. Since the inflection point 3603 and the inflection point 3604 belong to an identical X Group 2 cluster, the portable terminal 100 may equally adjust X coordinates of the inflection point 3603 and the inflection point 3604. Since the inflection point 3605 and the inflection point 3606 belong to an identical X Group 3 cluster, the portable terminal 100 may equally adjust X coordinates of the inflection point 3605 and the inflection point 3606. The portable terminal 100 may identically adjust coordinates of the inflection points belonging to the cluster and then allow points to be arranged in a shape of a straight line connecting adjacent inflection points among adjusted inflection points 3611 to 3616 as shown in FIG. 36B.

Referring to FIG. 37A, when an outline shape is determined with a combined shape, the portable terminal 100 may determine a curve line section and a straight line section. The portable terminal 100 may extract major curve line points of the curve line section, calculate a curve line control point using the extracted major curve line points and a Bezier curve formula, and cause points to be arranged along the Bezier curve according to the curve line control point. The portable terminal 100 may allow points to be arranged in the straight line among the inflection points in the straight line section.

Specifically, for example, the portable terminal 100 may determine a curve line section and a straight line section of an outline including the inflection points 3701 to 3705 as shown in FIG. 37A. The portable terminal 100 may extract major curve line points 3710 of the curve line section as shown in FIG. 37B. The portable terminal 100 may calculate a curve line control point 3720 using the major curve line points 3710 on the extracted curve line section and the Bezier curve formula as shown in FIG. 37C.

Figure 38:
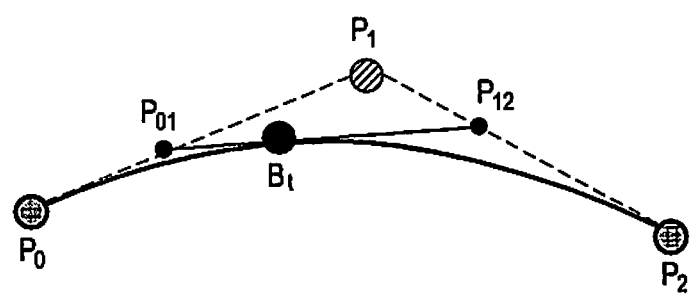

FIGS. 38 and 39A-39B illustrate a curve line control point 3720 calculating method using a Bezier curve formula according to an embodiment of the present disclosure.

Referring to FIG. 38, P0 is a curve line start point, P2 is a curve line end point, P1 is a curve line control point, and Bt is a focal point of a curve line.

The Bezier curve formula may be represented as shown in Equation (1) below.

$$P_{01} = (1-t)P_0 + tP_1$$

$$P_{12} = (1-t)P_1 + tP_2$$

$$B_t = (1-t)P_{01} + tP_{12}$$

$$B_t = (1-t)^2 P_0 + 2(1-t)tP_1 + t^2 P_2, t \in [1,0] \quad \text{Equation (1)}$$

The portable terminal 100 may calculate a curve line control point P1 using the major curve line points 3710 on the extracted curve line section and the Bezier curve formula of the Equation (1) as shown in FIG. 37B. A formula for calculating the curve line control point P1 may be represented as shown in Equation (2) below.

$$\begin{aligned} t = 0 & \quad P_1 = P_0 \\ t \in (1, 0) & \quad P_1 = \frac{B_t - (1-t)^2 P_0 - t^2 P_2}{2(1-t)t} \\ t = 1 & \quad P_1 = P_2 \end{aligned} \quad \text{Equation (2)}$$

Referring to FIG. 39A, the portable terminal 100 may set a Bt value as an xi value and sequentially substitute values of the major curve line points of the curve line section for xi values from a curve line start point P0 to a curve line end point P2 so as to calculate a curve line control point ci. A formula for calculating the curve line control point ci may be represented as shown in Equation (3) below.

$$c_i = \frac{x_i - (1-t)^2 P_0 - t^2 P_2}{2(1-t)t} \quad \text{Equation (3)}$$

$$t = \frac{|P_0 - x_i|}{|P_0 - x_i| + |P_2 - x_i|}$$

The portable terminal 100 may calculate curve line control points C1 to CN with respect to each of the major curve line point X1 to XN using the major curve line points X1 to XN existing between the curve line start point P0 and the curve line end point P2 as shown in FIG. 39A through Equation (3).

The portable terminal 100 may calculate a curve line control point C* using values of calculated curve line control points C1 to CN with respect to each of the major curve line points X1 to XN. A formula for calculating C* may be represented as shown in Equation (4) below.

$$c^* = \frac{\sum c_i}{N} \quad \text{Equation (4)}$$

Referring to the Equation (4), the portable terminal 100 may average values of the calculated curve line control points C1 to CN with respect to each of the major curve line points X1 to XN so as to calculate C*.

When the curve line control point 3720 has been calculated using the Bezier curve formula as described above, the portable terminal 100 may cause points on the curve line to be arranged along the Bezier curve according to the curve line control point 3720.

Referring back to FIG. 23, the adjustment and arrangement of positions of points on the outline are performed as described above and then the portable terminal 100 connects the points according to the adjustment and arrangement of positions of points so as to generate a corrected outline in step 2360.

FIGS. 40A-40C and 41A-41L illustrate an operation of connecting the points according to the adjustment and arrangement of positions of points and generating a corrected outline according to an embodiment of the present disclosure.

Referring to FIGS. 40A-40C, the portable terminal 100 may differently connect points according to attributes of a previous point and a next point with reference to a present point according to adjustment and arrangement of positions of points. As shown in FIG. 40A, when a present point 4010 is a general point which is not rounded and a section between the present point 4010 and a next point 4014 is a straight line, the portable terminal 100 may connect the present point 4010 and the next point 4014 with a straight line.

As shown in FIG. 40B, when a present point 4020 is a rounding point which is rounded and a section between the present point 4020 and a next point 4026 is a straight line, the portable terminal 100 may calculate a rounding start point 4022 and a rounding end point 4021 with reference to the present point 4020, connect a rounding start point 4022 and a rounding end point 4021 with a curve line according to a predetermined curvature, and connect the rounding start point 4022 and a rounding end point 4025 of the next point 4026 with a straight line As shown in FIG. 40C, when a present point 4030 is a rounding point which is rounded and a section between the present point 4030 and a next point 4036 is a curve, the portable terminal 100 may calculate a rounding start point 4032 at a middle point between the present point 4030 and a next point 4036, calculate a rounding end point 4031 at a middle point between the present point 4030 and a previous point 4034, connect the rounding start point 4032 and the rounding end point 4031 with a curve line according to a predetermined curvature, and connect the rounding start point 4032 and a rounding star point 4037 of the next point 4036 with a curve.

Referring to FIGS. 41A to 41L, when the portable terminal 100 connects the points according to the adjustment and arrangement of positions of points, twelve kinds of connection types may exist according to attributes of a previous point and a next point with reference to a present point.

When a present point 4110 is a straight line point which is not rounded, a previous point 4111 is a straight line point with reference to the present point 4110 and a next point 4112 is a straight line point, the portable terminal 100 may perform a connection as shown in FIG. 41A.

When a present point 4115 is a straight line point which is not rounded, a previous point 4116 is a straight line point with reference to the present point 4115 and a next point 4117 is a curve line point, the portable terminal 100 may perform a connection as shown in FIG. 41B.

When a present point 4120 is a straight line point which is not rounded, a previous point 4121 is a curve line point with reference to the present point 4120 and a next point 4122 is a straight line point, the portable terminal 100 may perform a connection as shown in FIG. 41C.

When a present point 4125 is a straight line point which is not rounded, a previous point 4126 is a straight line point with reference to the present point 4125 and a next point 4127 is a curve line point, the portable terminal 100 may perform a connection as shown in FIG. 41D.

When a present point 4130 is a straight line point which is rounded, a previous point 4131 is a straight line point with reference to the present point 4130 and a next point 4132 is a straight line point, the portable terminal 100 may perform a connection as shown in FIG. 41E.

When a present point 4135 is a straight line point which is rounded, a previous point 4136 is a straight line point with reference to the present point 4135 and a next point 4137 is a curve line point, the portable terminal 100 may perform a connection as shown in FIG. 41F.

When a present point 4140 is a straight line point which is rounded, a previous point 4141 is a curve line point with reference to the present point 4140 and a next point 4142 is a straight line point, the portable terminal 100 may perform a connection as shown in FIG. 41G.

When a present point 4145 is a straight line point which is rounded, a previous point 4146 is a curve line point with reference to the present point 4145 and a next point 4147 is a curve line point, the portable terminal 100 may perform a connection as shown in FIG. 41H.

When a present point 4150 is a curve line point, a previous point 4151 is a straight line point with reference to the present point 4150 and a next point 4152 is a straight line point, the portable terminal 100 may perform a connection as shown in FIG. 41I.

When a present point 4155 is a curve line point, a previous point 4156 is a straight line point with reference to the present point 4155 and a next point 4157 is a curve line point, the portable terminal 100 may perform a connection as shown in FIG. 41J.

When a present point 4160 is a curve line point, a previous point 4161 is a curve line point with reference to the present point 4160 and a next point 4162 is a straight line point, the portable terminal 100 may perform a connection as shown in FIG. 41K.

When a present point 4165 is a curve line point, a previous point 4166 is a curve line point with reference to the present point 4165 and a next point 4167 is a curve line point, the portable terminal 100 may perform a connection as shown in FIG. 41L.

As described above, the connections according to the adjustment and arrangement of positions of points on the outline are performed so that a corrected outline may be generated.

Referring back to FIG. 23, the portable terminal 100 generates the corrected outline in step 2360 and then determines whether an outline shape adjustment is requested by the user in step 2370 of FIG. 23. The portable terminal 100 may receive an inflection position changing request or a curve line control point position changing request of the corrected outline from the user, when the generated corrected outline is displayed on the touch screen 184.

When the outline shape adjustment is not requested by the user, the portable terminal 100 terminates an operation of generating the corrected outline.

When the outline shape adjustment is requested by the user, the portable terminal 100 adjusts an outline shape according the outline shape adjustment request by the user in step 2380.

FIGS. 42A-42C and 43A-43C illustrate an outline shape change according to an outline shape adjustment request according to an embodiment of the present disclosure.

Referring to FIG. 42A, when a polygon-shaped corrected outline is displayed, and when one inflection point 4205 among inflection points 4201 to 4206 on the corrected outline is requested to be changed into another position 4205-1 as shown in FIG. 42B, the portable terminal 100 may adjust and display a corrected outline shape according to the changed inflection point 4205-1 as shown in FIG. 42C.

Figure 43C:
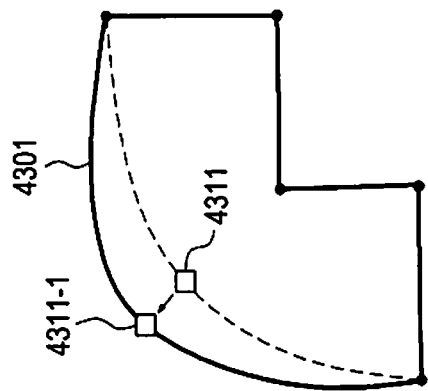
Figure 43B:
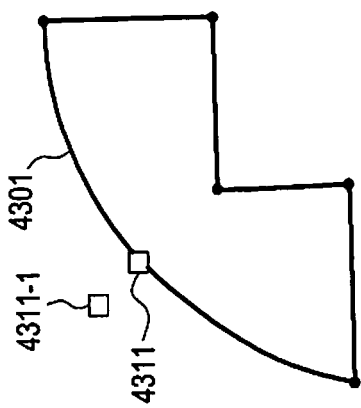
Figure 43A:
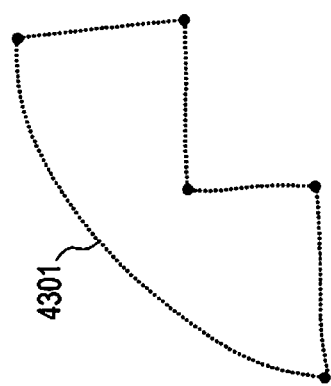

Referring to FIG. 43A, when a combination-shaped a corrected outline is displayed, and when one point 4311 among points on a curve line section 4301 on the corrected outline is requested to be changed into another position 4311-1 as shown in FIG. 43B, the portable terminal 100 may adjust and display a corrected outline shape according to a point position change 4311-1 on the curve line section 4301 as shown in FIG. 43C.

According to an embodiment of the present disclosure, the portable terminal 100 may provide a user interface screen for performing an image processing according to the embodiment of the present disclosure.

FIGS. 44A-44C, 45A-45C, 46A-46C, 47A-47C, 48A-48C and 49A-49C illustrate examples of a user interface screen for performing an image process according to an embodiment of the present disclosure.

Referring to FIGS. 44A-44C, 45A-45C, 46A-46C, 47A-47C, 48A-48C and 49A-49C, in the user interface screen for performing the image processing according to the embodiment of the present disclosure, one or more icons 4410 to 4450 may be displayed. The icons 4410 to 4450 may include an icon corresponding to an image import 4410, a pre-correction outline 4420, an outline correction 4430, a shape recognition correction 4440, and a crop 4450.

The image import 4410 is an icon to import a pre-stored image and display the image on the touch screen 184. The pre-correction outline 4420 is an icon to display an outline according to a drawing input by a user, that is, an outline before a correction. The outline correction 4430 is an icon to display an outline corrected according to an outline correction scheme. The shape recognition correction 4440 is an icon to display an outline corrected according to a shape recognition correction scheme. The crop 4450 is an icon to crop an image according to a corrected outline.

Figure 44A:
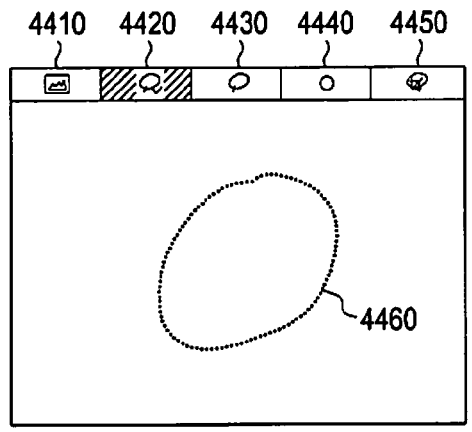
FIGS. 44A-44C, 45A-45C, 46A-46C, 47A-47C, 48A-48C and 49A-49C illustrate examples of a user interface screen for performing an image processing according to an embodiment of the present disclosure.
Figure 44B:
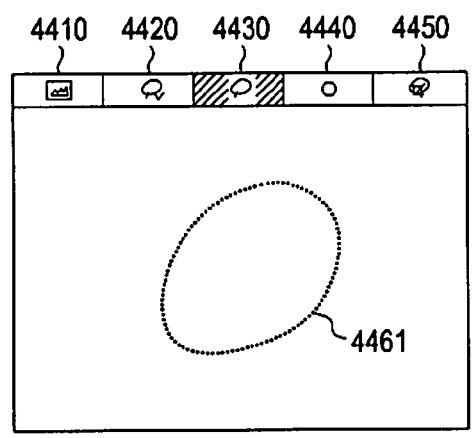
Figure 44C:
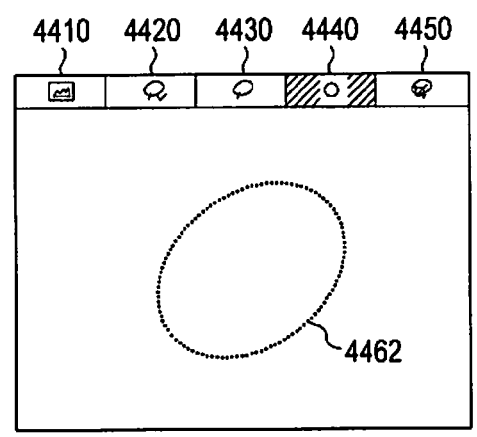

Referring to FIG. 44A, an outline 4460 according to a drawing input by a user is displayed. When an outline correction 4430 has been selected by the user, the portable terminal 100 may display a corrected outline 4461 by an outline correction scheme as shown in FIG. 44B. When the shape recognition correction 4440 has been selected by the user, the portable terminal 100 may recognize the outline shape as an ellipse and display an ellipse-shaped corrected outline 4462 as a result of the shape recognition as shown in FIG. 44C.

Figure 45A:
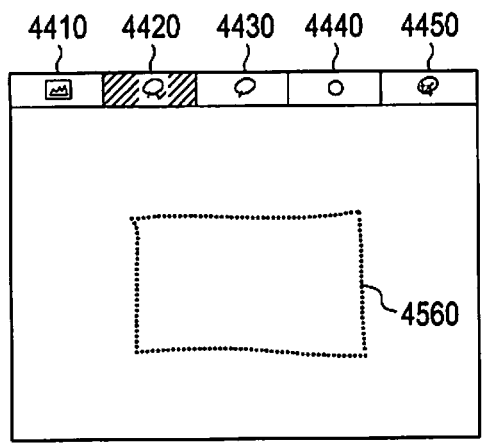
Figure 45B:
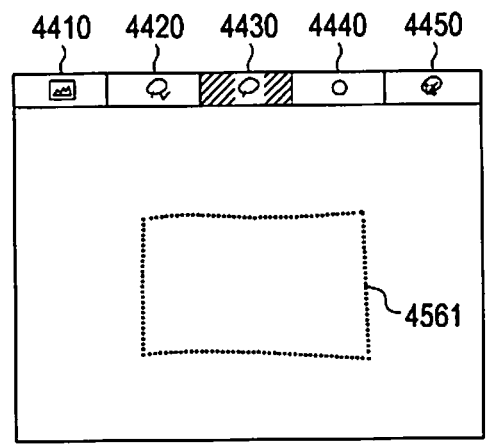
Figure 45C:
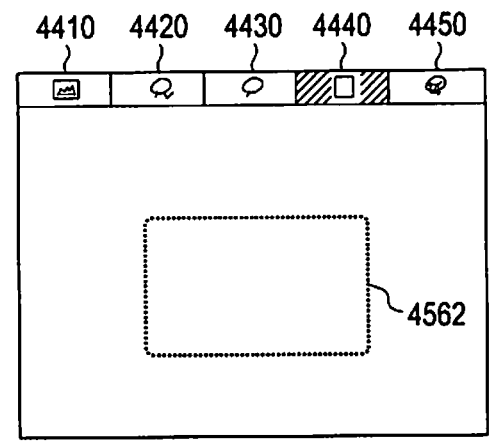

Referring to FIG. 45, an outline 4560 according to a drawing input by a user is displayed. When an outline correction 4430 has been selected by the user, the portable terminal 100 may display a corrected outline 4561 by an outline correction scheme as shown in FIG. 45B. When the shape recognition correction 4440 has been selected by the user, the portable terminal 100 may recognize the outline shape as a rectangle and display a rectangle-shaped corrected outline 4562 as a result of the shape recognition as shown in FIG. 45C. When a rounding processing is previously set, edges of the outline which is corrected with a rectangular shape may be rounded and displayed.

Figure 46A:
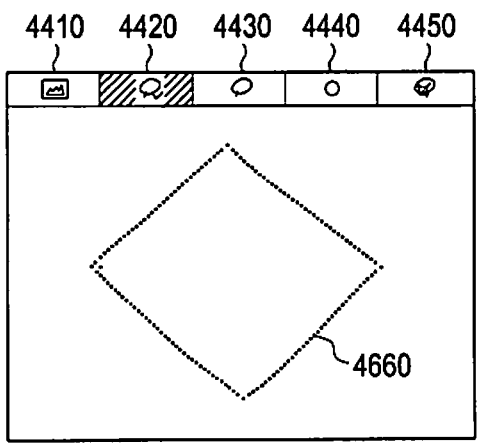
Figure 46B:
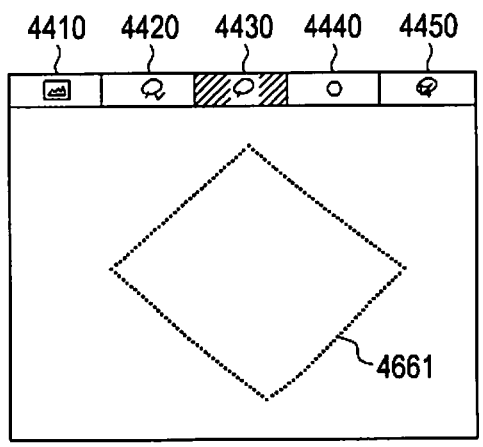
Figure 46C:
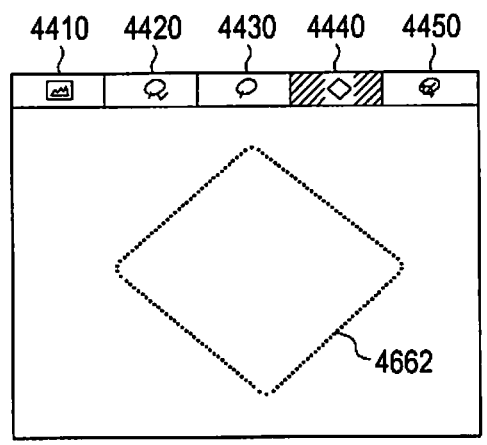

Referring to FIG. 46A, an outline 4660 according to a drawing input by a user is displayed. When an outline correction 4430 has been selected by the user, the portable terminal 100 may display a corrected outline 4661 by an outline correction scheme as shown in FIG. 46B. When the shape recognition correction 4440 has been selected by the user, the portable terminal 100 may recognize an outline shape as a quadrangle and display a quadrangle-shaped corrected outline 4662 as a result of the shape recognition as shown in FIG. 46C. When a rounding processing is previously set, edges of the outline which is corrected with a quadrangular shape may be rounded and displayed.

Figure 47A:
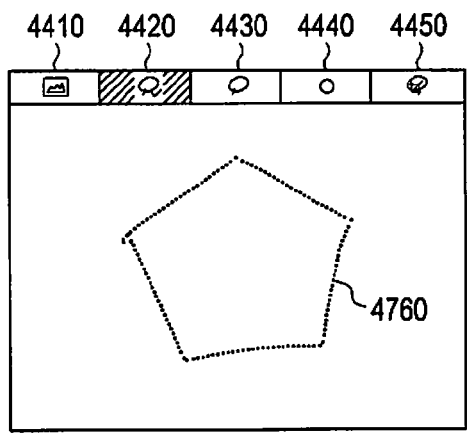
Figure 47B:
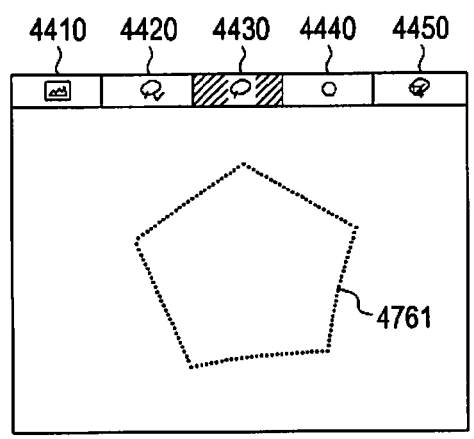
Figure 47C:
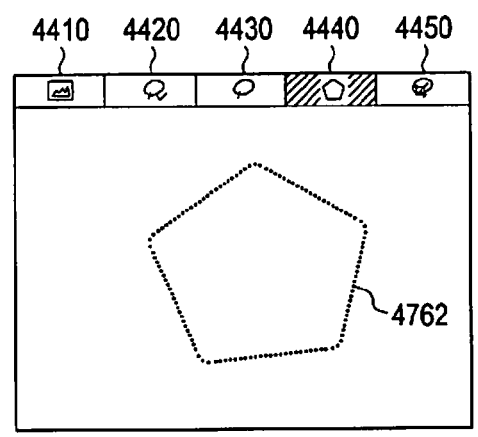

Referring to FIG. 47A, an outline 4760 according to a drawing input by a user is displayed. When an outline correction 4430 has been selected by the user, the portable terminal 100 may display a corrected outline 4761 by an outline correction scheme as shown in FIG. 47B. When the shape recognition correction 4440 has been selected by the user, the portable terminal 100 may recognize an outline shape as a polygon and display a polygon-shaped corrected outline 4762 as a result of the shape recognition as shown in FIG. 47C. When a rounding processing is previously set, edges of the outline which is corrected with a polygonal shape may be rounded and displayed.

Figure 48A:
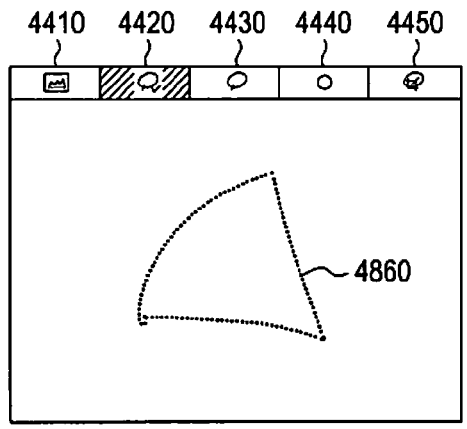
Figure 48B:
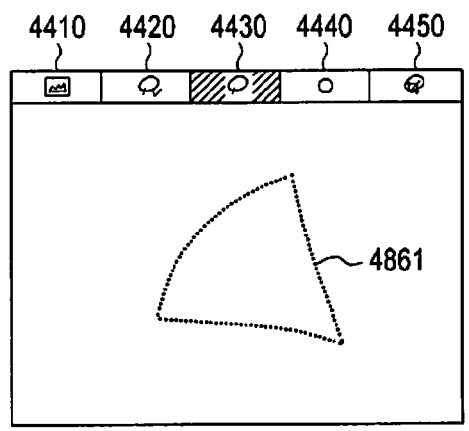
Figure 48C:
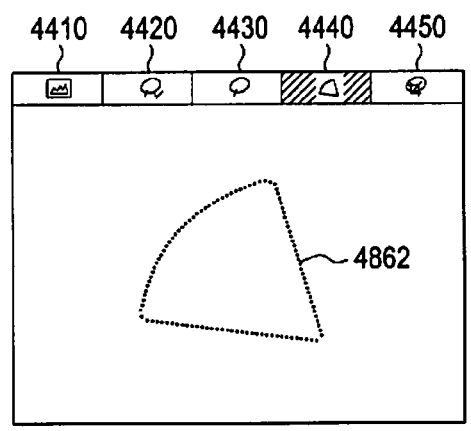

Referring to FIG. 48A, an outline 4860 according to a drawing input by a user is displayed. When an outline correction 4430 has been selected by the user, the portable terminal 100 may display a corrected outline 4861 by an outline correction scheme as shown in FIG. 48B. When the shape recognition correction 4440 has been selected by the user, the portable terminal 100 may recognize an outline shape as a combined shape and display a combination-shaped corrected outline 4862 as a result of the shape recognition as shown in FIG. 48C. When a rounding processing is previously set, edges of the outline which is corrected with a combined shape may be rounded and displayed.

Figure 49A:
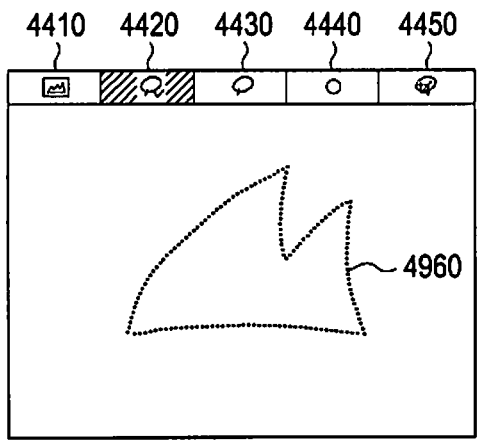
Figure 49B:
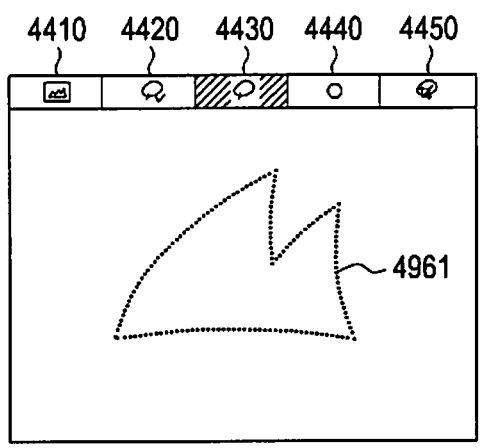
Figure 49C:
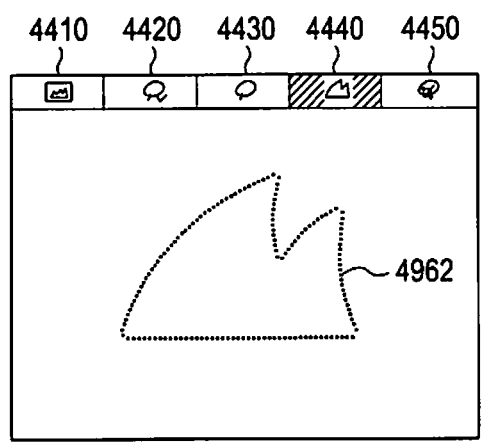

Referring to FIG. 49A, an outline 4960 according to a drawing input by a user is displayed. When an outline correction 4430 has been selected by the user, the portable terminal 100 may display a corrected outline 4961 by an outline correction scheme as shown in FIG. 49B. When the shape recognition correction 4440 has been selected by the user, the portable terminal 100 may recognize an outline shape as a combined shape and display a combination-shaped corrected outline 4962 as a result of the shape recognition as shown in FIG. 49C. When a rounding processing is previously set, edges of the outline which is corrected with a combined shape may be rounded and displayed.

Referring to the user interface screens such as FIGS. 44A-44C, 45A-45C, 46A-46C, 47A-47C, 48A-48C and 49A-49C, the user may, on the user interface screen, select the image import 4410 so as to import an image which the user wants and display the image on the touch screen 184, and then perform a drawing corresponding to the outline through the input unit 168 on the displayed image. The portable terminal 100 may display an outline according to a drawing input by a user, that is, an outline before a correction when the pre-correction outline 4420 has been selected, display a corrected outline with an outline correction scheme when the outline correction 4430 has been selected, and display an outline corrected with a shape recognition correction scheme when the shape recognition correction 4440 has been selected.

When the crop 4450 has been selected, the portable terminal 100 may crop an image within an outline before a correction according to the outline before the correction, crop an image within an outline corrected according to the outline correction scheme depending on a outline corrected according to the outline correction scheme, or crop an image within an outline corrected according to the shape recognition correction scheme.

Figure 50A:
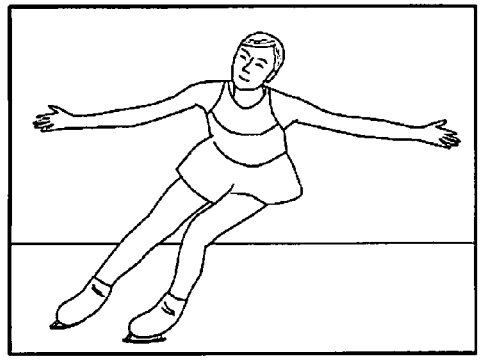
FIGS. 50A-50F illustrate examples of cropped images according to an embodiment of the present disclosure.
Figure 50B:
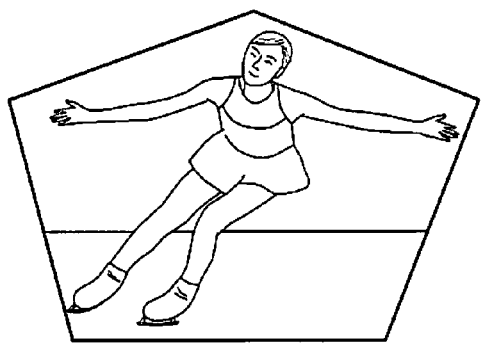
Figure 50C:
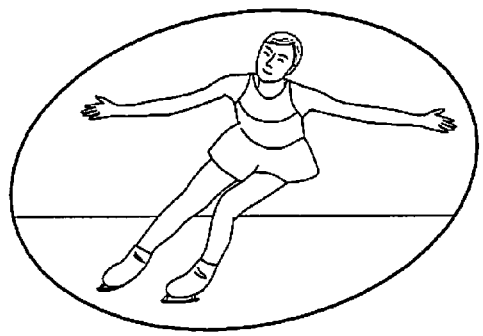
Figure 50D:
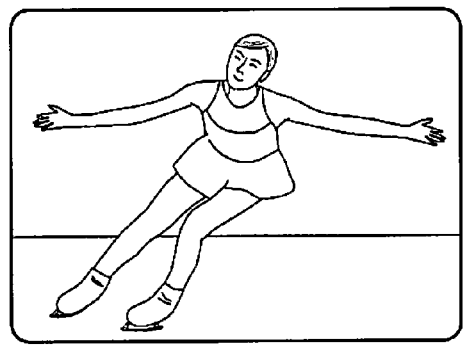
Figure 50E:
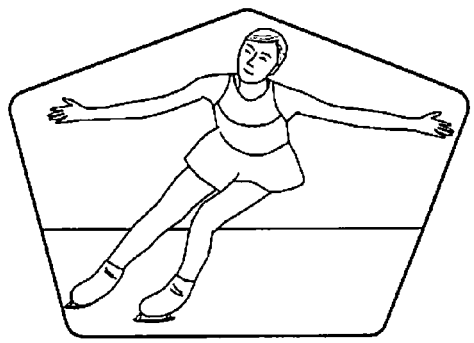
Figure 50F:
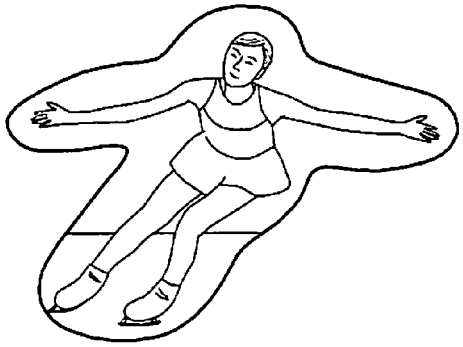

FIGS. 50A-50F illustrates examples of a crop image according to an embodiment of the present disclosure. The portable terminal 100 may crop an image as a rectangular shape along a rectangle-shaped outline as shown in FIG. 50A, crop an image as a polygon shape along a polygon-shaped outline as shown in FIG. 50B, and crop an image as an elliptical shape along an ellipse-shaped outline as shown in FIG. 50C. When an outline has been rounded, the portable terminal 100 may crop an image as a rounded rectangular shape along a rounded rectangle-shaped outline as shown in FIG. 50D, crop an image as a rounded polygon shape along a rounded polygon-shaped outline as shown in FIG. 50E, and crop an image as a rounded combined shape along a rounded combination-shaped outline as shown in FIG. 50F.

According to embodiments of the present disclosure as described above, an outline which is drawn by a user is corrected to be smooth through the outline correction scheme or the shape recognition correction scheme so as to more clearly crop the image when the image is cropped by using the outline. Further, according to the embodiments of the present disclosure, when an image is cropped, various outline shapes are recommended with a convenient scheme and an outline can be selected according to a shape selected by a user so that the user can conveniently crop the image into a shape which the user wants.

The methods according to the various embodiments of the present disclosure may be in a form of program instructions executed through various computer means to be recorded in a computer readable medium. The computer-readable medium may include a program command, a data file, and a data structure individually or a combination thereof. The program instructions recorded in the medium may be specially designed and configured for the present disclosure, or may be known to and usable by those skilled in the field of computer software.

An image processing method according to an embodiment of the present disclosure may be implemented in a form of hardware, software, or a combination of hardware and software. Any such software may be stored, for example, in a volatile or non-volatile storage device such as a ROM, a memory such as a RAM, a memory chip, a memory device, or a memory Integrated Circuit (IC), a recordable optical or magnetic medium such as a Compact Disc (CD), a Digital Video Disc (DVD), a magnetic disk, or a magnetic tape, regardless of its ability to be erased or its ability to be re-recorded, and a machine readable storage medium, e.g., a computer readable storage medium. It can be appreciated that the memory included in the mobile terminal is one example of machine-readable devices suitable for storing a program including instructions that are executed by a processor device to thereby implement embodiments of the present disclosure. Accordingly, the present disclosure includes a program for a code implementing the apparatus and method described in the appended claims of the specification and a machine (a computer or the like)-readable storage medium for storing the program. Further, the program may be electronically transferred by a predetermined medium such as a communication signal transferred through a wired or wireless connection, and the present disclosure appropriately includes equivalents of the program.

A portable terminal according to the embodiments of the present disclosure may receive the program from a program providing device that is wiredly or wirelessly connected with the portable terminal, and may store the program. The program providing device may include a memory for storing programs including instructions allowing the user interface methods according to the various embodiments of the present disclosure to be performed, a communication unit for performing wired or wireless communication with the mobile terminal, and a controller that make a control such that the corresponding program is transmitted through the communication unit according to a request of the mobile terminal or automatically.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. An image processing method in an electronic device, the method comprising:
   displaying an image on a display of the electronics device;
   receiving a drawing input on the displayed image;
   performing an end point processing to adjust the outline of the drawing input, the end point processing comprising:
      determining a start point and an end point of the outline;
      determining a circle with reference to the start point and the end point; and
      adding points to or deleting points from the drawing input based on the circle;
   extracting turning points on the adjusted outline of the drawing input which are points where the outline turns at an angle larger than a predetermined reference value;
   arranging the extracted turning points on the outline to obtain an arranged outline;
   correcting the arranged outline according to a correction scheme selected based on a recognition of the shape of the drawing input;
   cropping the image according to the corrected outline.

2. The image processing method of claim 1, further comprising:
   recommending one or more outline shapes corresponding to the outline according to the drawing input, among predetermined outline shapes; and
   cropping an image within an outline having an outline shape selected by a user.

3. The image processing method of claim 1, wherein the correction scheme comprises one of an outline correction scheme and a shape recognition correction scheme.

4. The image processing method of claim 1, wherein performing the outline end point processing comprises:
   determining-a-start-point-and-an endpoint of the outline according to the drawing-input on-the image;
   removing-points-within-a-circle by-selecting the circle with reference to the start point and the end point; and
   detecting an intersection point of a slope of a start section and a slope of an end section, according to the determined start point and end point;
   adding outline points within the circle using the intersection point when the intersection point exists within the circle; and
   adding the outline points to a straight line between points in which the circle and the outline meet when the intersection point does not exist within the circle.

5. The image processing method of claim 1, wherein correcting the outline according to the drawing input on the image according to the correction scheme comprises smoothing points connecting adjacent turning points among the extracted and arranged turning points.

6. The image processing method of claim 1, wherein correcting the outline according to the drawing input on the image according to the correction scheme further comprises:
   determining an outline shape using the extracted and arranged turning points;
   adjusting and arranging of positions of points on the outline according to the outline shape; and
   generating a corrected outline by connecting the position-adjusted and position-arranged points.

7. The image processing method of claim 6, further comprising:
   adjusting the outline shape using position-changed points in response to a request for a corrected outline shape adjustment.

8. The image processing method of claim 6, wherein determining the outline shape comprises:
   determining whether the outline shape is a circular shape by performing a circular shape checking when the number of the inflection points is fewer than or equal to two;
   determining whether the outline shape is a quadrangular shape by performing a quadrangular shape checking when the number of the inflection points is four;
   determining whether the outline shape is a polygonal shape by performing a polygonal shape checking when the number of the inflection points is three or more than or equal to five; and determining whether the outline shape is a combined shape when a curve line section exists on the outline.

9. A non-transitory computer-readable medium which stores an image processing program performing a method in a portable terminal, the method comprising:
  displaying an image;
  receiving a drawing input;
  performing an end point processing to adjust the outline of the drawing input, the end point processing comprising:
    determining a start point and an end point of the outline;
    determining a circle with reference to the start point and the end point; and
    adding points to or deleting points from the drawing input based on the circle;
  extracting turning points on the adjusted outline of the drawing input which are points where the outline turns at an angle larger than a predetermined reference value;
  arranging the extracted turning points on the outline to obtain an arranged outline;
  correcting the arranged outline according to a correction scheme selected based on a recognition of the shape of the drawing input;
  cropping the image according to the corrected outline.

10. An electronic device comprising:
  a display unit configured to display an image; and
  a processor configured to control to:
  receive a drawing input on the displayed image;
  perform an end point processing to adjust the outline of the drawing input, the end point processing comprising:
    determining a start point and an end point of the outline;
    determining a circle with reference to the start point and the end point; and
    adding points to or delete points from the drawing input based on the circle;
  extracts turning points on the outline of the drawing input which are points where the outline turns at an angle larger than a predetermined reference value;
  arrange the extracted turning points on the outline to obtain an arranged outline;
  correct the arranged outline according to a correction scheme selected based on a recognition of the shape of the drawing input;
  crop the image according to the corrected outline.

11. The electronic device of claim 10, wherein the processor is further configured to recommend one or more outline shapes corresponding to the arranged outline of the drawing input, among predetermined outline shapes, and to crop an image within an outline having an outline shape selected by a user.

12. The electronic device of claim 10, wherein the correction scheme comprises one of an outline correction scheme and a shape recognition correction scheme.

13. The electronic device of claim 1, wherein the step of adding points to or deleting points from the drawing input based on the circle comprises:
  removing drawing points within the circle;
  detecting an intersection point of a slope of a start section and a slope of an end section according to the determined start point and end point; and
  adding outline points within the circle using the intersection point when the intersection point exists within the circle; and
  adding outline points on a straight line between points in which the circle and the outline meet when the intersection point does not exist within the circle.

14. The electronic device of claim 10, wherein the correction scheme comprises an outline correction scheme which smoothes points connecting adjacent turning points among the extracted and arranged turning points.

15. The electronic device of claim 10, wherein the correction scheme comprises a shape recognition correction scheme which determines an outline shape using the extracted and arranged turning points, performs adjustment and arrangement of positions of points on the outline according to the outline shape, and generates a corrected outline by connecting the position-adjusted and position-arranged points.

16. The electronic device of claim 15, wherein the processor is further configured to adjust the outline shape using position-changed points in response to a request for a corrected outline shape adjustment.

17. The electronic device of claim 15, wherein the processor is further configured to determine the outline shape according to a number of the turning points and whether a curve line section exists.

18. The electronic device of claim 17, wherein the processor is further configured to determine whether the outline shape is a circular shape by performing a circular shape checking when the number of the inflection points is fewer than or equal to two, to determine whether the outline shape is a quadranglar shape by performing a quadrangular shape checking when the number of the inflection points is four, to determine whether the outline shape is a polygonal shape by performing a polygonal shape checking when the number of the inflection points is three or more than or equal to five, and to determine whether the outline shape is a combined shape when a curve line section exists on the outline.

* * * * *